United States Patent
Fan et al.

(10) Patent No.: US 12,350,651 B2
(45) Date of Patent: Jul. 8, 2025

(54) MESOPOROUS SUPPORT-IMMOBILIZED METAL OXIDE-BASED NANOPARTICLES

(71) Applicant: OHIO STATE INNOVATION FOUNDATION, Columbus, OH (US)

(72) Inventors: Liang-Shih Fan, Columbus, OH (US); Yan Liu, Columbus, OH (US); Lang Qin, Columbus, OH (US); Zhuo Cheng, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 649 days.

(21) Appl. No.: 17/636,160

(22) PCT Filed: Aug. 19, 2020

(86) PCT No.: PCT/US2020/046918
§ 371 (c)(1),
(2) Date: Feb. 17, 2022

(87) PCT Pub. No.: WO2021/034888
PCT Pub. Date: Feb. 25, 2021

(65) Prior Publication Data
US 2022/0288568 A1  Sep. 15, 2022

Related U.S. Application Data

(60) Provisional application No. 62/888,886, filed on Aug. 19, 2019.

(51) Int. Cl.
*B01J 23/745* (2006.01)
*B01J 21/08* (2006.01)
(Continued)

(52) U.S. Cl.
CPC .............. *B01J 23/745* (2013.01); *B01J 21/08* (2013.01); *B01J 35/23* (2024.01); *B01J 35/393* (2024.01);
(Continued)

(58) Field of Classification Search
None
See application file for complete search history.

(56) References Cited

U.S. PATENT DOCUMENTS

| | | | |
|---|---|---|---|
| 971,206 | A | 9/1910 | Messerschmitt |
| 1,078,686 | A | 11/1913 | Lane |

(Continued)

FOREIGN PATENT DOCUMENTS

| | | |
|---|---|---|
| CN | 1329761 A | 1/2001 |
| CN | 1325319 A | 12/2001 |

(Continued)

OTHER PUBLICATIONS

Tanya Tsoncheva et al. "Critical evaluation of the state of iron oxide nanoparticles on different mesoporous silicas prepared by an impregnation method" Microporous and Mesoporous Materials 112 (2008) 327-337 (Year: 2008 ).*

(Continued)

*Primary Examiner* — Coris Fung
*Assistant Examiner* — Jialan Zhang
(74) *Attorney, Agent, or Firm* — Michael Best & Friedrich LLP

(57) ABSTRACT

Exemplary oxygen carrier particles may comprise a mesoporous support and a plurality of metal oxide-based nanoparticles immobilized on the mesoporous support. The plurality of metal oxide-based nanoparticles may comprise 10 volume percent to 80 volume percent of mesopores in the mesoporous support. A reactor may comprise a feedstock inlet in fluid communication with a carbonaceous feedstock (Continued)

source, a product stream outlet, and oxygen carrier particles. Exemplary reactors may be operated by providing a carbonaceous feedstock to an inlet of the reactor, providing oxygen carrier particles within the reactor, and collecting a product stream from an outlet of the reactor.

16 Claims, 25 Drawing Sheets

(51) Int. Cl.
| | |
|---|---|
| *B01J 35/23* | (2024.01) |
| *B01J 35/30* | (2024.01) |
| *B01J 35/64* | (2024.01) |
| *C01B 3/40* | (2006.01) |
| *C01B 32/40* | (2017.01) |

(52) U.S. Cl.
CPC ............. *B01J 35/647* (2024.01); *C01B 3/40* (2013.01); *C01B 32/40* (2017.08); *C01B 2203/0238* (2013.01); *C01B 2203/0283* (2013.01); *C01B 2203/1047* (2013.01); *C01B 2203/1241* (2013.01)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A | 5/1968 | Kitagawa |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,801,661 A | 4/1974 | Hart et al. |
| 3,879,514 A | 4/1975 | Dahl |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A | 4/1979 | Gidaspow et al. |
| 4,155,832 A | 5/1979 | Cox et al. |
| 4,160,663 A | 7/1979 | Hsieh |
| 4,212,452 A | 7/1980 | Hsieh |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 4,957,523 A | 9/1990 | Zarate et al. |
| 5,130,106 A | 7/1992 | Koves et al. |
| 5,365,560 A | 11/1994 | Tam |
| 5,447,024 A | 9/1995 | Ishida et al. |
| 5,456,807 A | 10/1995 | Wachsman |
| 5,509,362 A | 4/1996 | Lyon |
| 5,518,187 A | 5/1996 | Bruno et al. |
| 5,529,599 A | 6/1996 | Calderon |
| 5,545,251 A | 8/1996 | Knop |
| 5,584,615 A | 12/1996 | Micklich |
| 5,630,368 A | 5/1997 | Wagoner |
| 5,730,763 A | 3/1998 | Manulescu et al. |
| 5,762,681 A | 6/1998 | Lee et al. |
| 5,770,310 A | 6/1998 | Nogochi et al. |
| 5,827,496 A | 10/1998 | Lyon |
| 5,858,210 A | 1/1999 | Richardson |
| 5,891,415 A | 4/1999 | Alkhazov et al. |
| 5,965,098 A | 10/1999 | Boegner et al. |
| 6,007,699 A | 12/1999 | Cole |
| 6,030,589 A | 2/2000 | Hartweg et al. |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 | 1/2003 | Jain et al. |
| 6,509,000 B1 | 1/2003 | Choudhary et al. |
| 6,517,631 B2 | 2/2003 | Bland |
| 6,607,704 B2 | 8/2003 | Guttridge et al. |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 2/2006 | Fan et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 | 11/2014 | Fan et al. |
| 9,017,627 B2 | 4/2015 | Gupta |
| 9,290,386 B2 | 3/2016 | Wasas |
| 9,376,318 B2 | 6/2016 | Fan et al. |
| 9,382,359 B2 | 7/2016 | Kanellopoulos et al. |
| 9,518,236 B2 | 12/2016 | Fan et al. |
| 9,573,118 B2 | 2/2017 | Colozzi et al. |

(56) References Cited

U.S. PATENT DOCUMENTS

| | | |
|---|---|---|
| 9,616,403 B2 | 4/2017 | Fan et al. |
| 9,777,920 B2 | 10/2017 | Fan et al. |
| 9,790,605 B2 | 10/2017 | Sheehan et al. |
| 9,903,584 B2 | 2/2018 | Fan et al. |
| 10,010,847 B2 | 7/2018 | Fan et al. |
| 10,081,772 B2 | 9/2018 | Fan et al. |
| 10,144,640 B2 | 12/2018 | Fan et al. |
| 10,501,318 B2 | 12/2019 | Fan et al. |
| 10,865,346 B2 | 12/2020 | Fan et al. |
| 11,111,143 B2 | 9/2021 | Fan et al. |
| 2001/0055559 A1 | 12/2001 | Sanfilippo et al. |
| 2002/0011428 A1 | 1/2002 | Scheuerman |
| 2002/0059864 A1 | 5/2002 | Janssen et al. |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0102254 A1 | 6/2003 | Eijsbouts et al. |
| 2003/0119658 A1 | 6/2003 | Allison et al. |
| 2003/0124041 A1 | 7/2003 | Neumann et al. |
| 2003/0130360 A1 | 7/2003 | Kindig et al. |
| 2003/0153632 A1 | 8/2003 | Wang et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0092784 A1 | 5/2004 | Legendre |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0117714 A1 | 5/2007 | Geyer et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0119419 A1 | 5/2010 | Sprouse et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0138788 A1 | 6/2011 | Kanda et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0115715 A1* | 5/2012 | Wolters ............ B01J 29/0333 502/240 |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0071314 A1 | 3/2013 | Gupta |
| 2013/0085365 A1 | 4/2013 | Marashdeh et al. |
| 2013/0125462 A1 | 5/2013 | Greiner et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0021028 A1 | 1/2014 | Paganessi et al. |
| 2014/0134096 A1 | 5/2014 | Angelini et al. |
| 2014/0144082 A1 | 5/2014 | Fan et al. |
| 2014/0275297 A1 | 9/2014 | Velazquez-Vargas et al. |
| 2015/0238915 A1 | 8/2015 | Fan et al. |
| 2015/0291420 A1 | 10/2015 | Colozzi et al. |
| 2015/0343416 A1 | 12/2015 | Fadhel et al. |
| 2016/0002034 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0115026 A1 | 4/2016 | Angelini et al. |
| 2016/0268616 A1 | 9/2016 | Fan et al. |
| 2017/0015554 A1 | 1/2017 | Siengchum et al. |
| 2017/0106355 A1 | 4/2017 | Colozzi et al. |
| 2018/0296978 A1 | 10/2018 | Peck et al. |
| 2018/0353933 A1 | 12/2018 | Wendland et al. |
| 2019/0003704 A1 | 1/2019 | Aranda et al. |
| 2019/0152778 A1 | 5/2019 | Fan et al. |
| 2019/0232220 A1 | 8/2019 | Fan et al. |
| 2020/0156032 A1 | 5/2020 | Fan et al. |

FOREIGN PATENT DOCUMENTS

| | | |
|---|---|---|
| CN | 1454711 A | 11/2003 |
| CN | 1501534 A | 6/2004 |
| CN | 101389734 A | 3/2009 |
| CN | 101426885 A | 5/2009 |
| CN | 102187153 A | 9/2011 |
| CN | 102388005 A | 3/2012 |
| CN | 102612625 A | 7/2012 |
| CN | 102639213 A | 8/2012 |
| CN | 102686301 A | 9/2012 |
| CN | 103468322 A | 12/2013 |
| DE | 102010028816 A1 | 11/2011 |
| EP | 0161970 A1 | 11/1985 |
| EP | 1134187 A2 | 9/2001 |
| EP | 1445018 A1 | 8/2004 |
| EP | 1580162 A2 | 9/2005 |
| EP | 1845579 A2 | 10/2007 |
| EP | 1933087 A2 | 6/2008 |
| EP | 2279785 A2 | 2/2011 |
| EP | 2441816 A1 | 4/2012 |
| EP | 2450420 A1 | 5/2012 |
| EP | 2495030 A2 | 9/2012 |
| EP | 2515038 A1 | 10/2012 |
| EP | 2601443 | 6/2013 |
| EP | 1976633 B1 | 3/2014 |
| FR | 2924035 A1 | 5/2009 |
| JP | H03-68898 A | 3/1991 |
| JP | H10249153 A | 9/1998 |
| JP | 2006-502957 A | 1/2006 |
| KR | 20060096609 A | 9/2006 |
| KR | 101364823 B1 | 2/2014 |
| TW | 406055 B | 9/2000 |
| TW | 426728 B | 3/2001 |
| WO | WO1990/013773 A1 | 11/1990 |
| WO | WO1999/065097 A1 | 12/1999 |
| WO | WO2000/022690 A1 | 4/2000 |
| WO | WO2000/068339 A1 | 11/2000 |

(56) References Cited

FOREIGN PATENT DOCUMENTS

| | | |
|---|---|---|
| WO | WO2001/042132 A1 | 6/2001 |
| WO | WO2003/070629 A1 | 8/2003 |
| WO | WO2007/082089 A2 | 7/2007 |
| WO | WO2007/122498 A2 | 11/2007 |
| WO | WO2007/134075 A2 | 11/2007 |
| WO | WO2008/019079 A2 | 2/2008 |
| WO | WO2008/071215 A1 | 6/2008 |
| WO | WO2008/082312 A1 | 7/2008 |
| WO | WO2008/115076 A2 | 9/2008 |
| WO | WO2009/007200 A2 | 1/2009 |
| WO | WO2009/008565 A1 | 1/2009 |
| WO | WO2009/009388 A2 | 1/2009 |
| WO | WO2009/021258 A1 | 2/2009 |
| WO | WO2009/023515 A2 | 2/2009 |
| WO | WO2009/114309 A2 | 9/2009 |
| WO | WO2010/037011 A2 | 4/2010 |
| WO | WO2010/063923 A2 | 6/2010 |
| WO | WO2010/126617 A1 | 11/2010 |
| WO | WO2011/021161 A2 | 2/2011 |
| WO | WO2011/031752 A2 | 3/2011 |
| WO | WO2011/031755 A1 | 3/2011 |
| WO | WO2011/084734 A2 | 7/2011 |
| WO | WO2012/064712 A1 | 5/2012 |
| WO | WO2012/077978 A2 | 6/2012 |
| WO | WO2012/144899 A1 | 10/2012 |
| WO | WO2012/155054 A1 | 11/2012 |
| WO | WO2012/155059 A1 | 11/2012 |
| WO | WO2013/040645 A1 | 3/2013 |
| WO | WO2014/085243 A1 | 6/2014 |
| WO | WO2014/091024 A1 | 6/2014 |
| WO | WO2014/152814 A1 | 9/2014 |
| WO | WO2011/153568 A1 | 12/2014 |
| WO | WO2014/195904 A1 | 12/2014 |
| WO | 2015/016956 A1 | 2/2015 |
| WO | WO2016/053941 A1 | 4/2016 |
| WO | WO2017/162427 A1 | 9/2017 |
| WO | WO2018/166812 A1 | 9/2018 |
| WO | WO2020/210865 A1 | 10/2020 |

OTHER PUBLICATIONS

Tsoncheva et al. "Critical evaluation of the state of iron oxide nanoparticles on different mesoporous silicas prepared by an impregnation method" Microporous and Mesoporous Materials 112 (2008) 327-337 (Year: 2008).*

T. Tsoncheva et al., "Preparation, characterization and catalytic behavior in methanol decomposition of nanosized iron oxide particles within large pore ordered mesoporous silicas", Micropor. Mesopor. Mater. 89 (2006) 209 (Year: 2006).*

Marban et al. "A highly active, selective and stable copper/cobalt-structured nanocatalyst for methanol decomposition" Applied Catalysis B: Environmental, 99 (2010) 257-264 (Year: 2010).*

Nanoparticle Technology Handbook, Chapter 2, https://www.sciencedirect.com/science/article/pii/B9780444531223500052?ref=pdf_download&fr=RR-2&rr=8d3b770a3f0f3035 (Year: 2008).*

Dimitrov et al. "Mesoporous TiO2 powders as host matrices for iron nanoparticles. Effect of the preparation procedure and doping with Hf" Nano-Structures & Nano-Objects 7 (2016) 56-63 (Year: 2016).*

CRC Handbook of Chemistry and Physics 95th Edition, p. 4-138 and p. 4-144 (Year: 2014).*

Heliogen, "Heliogen, Replacing fuels with sunlight," <https://heliogen.com/> Accessed Aug. 26, 2020.

Hsieh et al., "250 kWth high pressure pilot demonstration of the syngas chemical looping system for high purity H2 production with CO2 capture," Applied energy, 2018, 230: 1660-1672.

Zhou et al., "Syngas chemical looping process: Dynamic modeling of a moving-bed reducer," AIChE Journal, 2013, 59 (9): 3432-3443.

Abad et al., "Chemical-looping combustion in a 300 W continuously operating reactor system using a manganese-based oxygen carrier," Fuel, 2006, vol. 85, Issue 9, pp. 1174-1185.

Abad et al., "Reduction Kinetics of CU-, Ni-, and Fe-Based Oxygen Carriers Using Syngas (CO + H2) for Chemical-Looping Combustion," Energy Fuels, 2007, 21 (4), pp. 1843-1853.

Abad et al., "The use of iron oxide as oxygen carrier in a chemical-looping reactor," Fuel, 2007, vol. 86, Issues 7-8, pp. 1021-1035.

Abdallah et al., "Comparison of mesoporous silicate supports for the immobilisation and activity of cytochrome c and lipase," J. Mol. Catal. B: Enzym., 2014, 108, 82-88.

Adanez et al., "Progress in Chemical-Looping Combustion and Reforming technologies," Progress in Energy and Combustion Science, 2012, vol. 38, Issue 2, pp. 215-282.

Adanez et al., "Selection of oxygen carriers for chemical-looping combustion," Energy & Fuels, American Chemical Society, 2004, vol. 18, No. 2, pp. 371-377.

Ahern et al., "Comparison of fenofibratemesoporous silica drug-loading processes for enhanced drug delivery," Eur. J. Pharm. Sci., 2013, 50, 400-409.

Alalwan et al., "Co3O4 nanoparticles as oxygen carriers for chemical looping combustion: A materials characterization approach to understanding oxygen carrier performance," Chemical Engineering Journal, 2017, 319, 279-287.

Alalwan et al., "α-Fe2O3 Nanoparticles as Oxygen Carriers for Chemical Looping Combustion: An Integrated Materials Characterization Approach to Understanding Oxygen Carrier Performance, Reduction Mechanism, and Particle Size Effects," Energy Fuels, 2018, 32, 7959-7970.

Anisimov et al., "Density-functional calculation of effective Coulomb interactions in metals," Phys. Rev. B, 1991, 43, 7570.

Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.

Balasubramanian et al., "Hydrogen from methane in a single-step process," Chem Engr Science, 1999, 54(15-16), 3543.

Barreca et al., "Methanolysis of styrene oxide catalysed by a highly efficient zirconium-doped mesoporous silica," Appl. Catal. A, 2006, 304, 14-20.

Bell et al., "H2 Production via Ammonia Decomposition Using Non-Noble Metal Catalysts: A Review," Top Catal, 2016, 59, 1438-1457.

Burke et al., "Large pore bi-functionalised mesoporous silica for metal ion pollution treatment," J. Hazard. Mater., 2009, 164, 229-234.

Cao et al., "Investigation of Chemical Looping Combustion by Solid Fuels. 1. Process Analysis," Energy Fuels, 2006, 20(5), pp. 1836-1844.

Carrero et al., "A critical literature review of the kinetics for the oxidative dehydrogenation of propane over well-defined supported vanadium oxide catalysts," ACS Catalysis, 2014, 4: 3357-3380.

Cavani et al., "Oxidative dehydrogenation of ethane and propane: How far from commercial implementation?" Catalysis Today, 2007, 127(1): 113-131.

Cheng et al., "Carbon Dioxide Adsorption and Activation on Ceria (110): A density functional theory study," J. Chem. Phys. 2013, 138, 014702.

Cheng et al., "Methane Adsorption and Dissociation on Iron Oxide Oxygen Carrier: Role of Oxygen Vacancy," Phys. Chem. Chem. Phys. 2016, 18, 16423-16435.

Cheng et al., "Oxygen vacancy promoted methane partial oxidation over iron oxide oxygen carrier in chemical looping process," Phys. Chem. Chem. Phys., 2016, 18, 32418-32428.

Cheng et al., "Propagation of Olefin Metathesis to Propene on WO3 Catalysts: A Mechanistic and Kinetic Study," ACS Catal. 2015, 5, 59-72.

Cho et al., "Comparison of iron-, nickel-, copper- and manganese-based oxygen carriers for chemical-looping combustion," Fuel, 2004, vol. 83, Issue 9, pp. 1215-1225.

Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.

(56) References Cited

OTHER PUBLICATIONS

Coleman et al., "Synthesis and characterization of dimensionally ordered semiconductor nanowires within mesoporous silica," J. Am. Chem. Soc., 2001, 123, 7010-7016.

Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18 (2012), pp. 1274-1281.

De Diego et al., "Development of Cu-based oxygen carriers for chemical-looping combustion," Fuel, 2004, vol. 83, Issue 13, pp. 1749-1757.

De Klerk, "Gas-to-Liquid Conversion." Natural Gas Conversion Technologies Workshop of ARPA-E. U.S. Department of Energy, Houston, TX. vol 13 (2012).

Delaney et al., "Development of chemically engineered porous metal oxides for phosphate removal," J. Hazard. Mater., 2011, 185, 382-391.

Delaney et al., "Porous silica spheres as indoor air pollutant scavengers," J. Environ. Monit., 2010, 12, 2244-2251.

Denton et al., "Simultaneous Production of High-Purity Hydrogen and Sequestration-Ready CO2 from Syngas," 2003.

EIA—Independent Statistics and Analysis. U.S. Department of Energy, U.S. Energy Information Administration "Annual Energy Outlook 2015 with Projections to 2040," Apr. 2015.

EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.

EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.

EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.

Environmental Protection Agency, "Geological CO2 Sequestration Technology and Cost Analysis," Technical Support Document, pp. i-vi & pp. 1-61, Jun. 2008.

Faezad Othman et al., "Utilization of Low-Grade Iron Ore in Ammonia Decomposition," Procedia Chemistry, 2016, 19:119-124.

Faezad Othman et al., "Utilization of Malaysian Low Grade Iron Ore as Medium for Ammonia Decomposition," ARPN Journal of Engineering and Applied Sciences, 2015, 10(22):17286-17288.

Fan et al., "Chemical looping processes for CO2 capture and carbonaceous fuel conversion prospect and opportunity," Energy Environmental Science, 2012, p. 7254-7280.

Fan et al., "Utilization of chemical looping strategy in coal gasification processes," Particuology, 2008, vol. 6, Issue 3, pp. 131-142.

Fan et al., "Chemical-Looping Technology Platform," AIChE Journal, 61(1), 2-22 (2015).

Fan, "Chemical Looping Systems for Fossil Energy Conversions," Wiley-AIChE: Hoboken, NJ, U.S.A.; 2010.

Flynn et al., "Pervaporation performance enhancement through the incorporation of mesoporous silica spheres into PVA membranes," Sep. Purif. Technol., 2013, 118, 73-80.

Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.

Forzatti, "Present status and perspectives in de-NOx SCR catalysis." Appl. Catal. A: Gen., 222(1-2), 2001, 221-236.

Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.

Garcia-Labiano et al., "Temperature variations in the oxygen carrier particles during their reduction and oxidation in a chemical-looping combustion system," Chemical Engineering Science, 2005, vol. 60, No. 3, pp. 851-862.

Geldart, "Types of Gas Fluidization," Power Technology, vol. 7, pp. 285-292, 1973.

Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.

Ghoneim et al., "Review on innovative catalytic reforming of natural gas to syngas," World J. Eng. Technol, 2016, 4(1):116-139.

Go et al., "Hydrogen production from two-step steam methane reforming in a fluidized bed reactor," International Journal of Hydrogen Energy, 2009, vol. 34, p. 1301-1309.

Goellner et al., "Baseline analysis of crude methanol production from coal and natural gas," National Energy Technology Laboratory (NETL), US Department of Energy, 2014, 83 pages.

Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).

Grimme et al., "A consistent and accurate ab initio parametrization of density functional dispersion correction (DFT-D) for the 94 elements H—Pu," J. Chem. Phys., 2010, 132, 19.

Grimme et al., "Effect of the damping function in dispersion corrected density functional theory," J. Comput. Chem., 2011, 32, 1456-1465.

Haque, "Microwave energy for mineral treatment processes—a brief review," International Journal of Mineral Processing, vol. 57, pp. 1-24, 1999.

Henkelman et al., "A climbing image nudged elastic band method for finding saddle points and minimum energy paths," J. Chem. Phys., 2000, 113, 9901-9904.

Herbst et al., "Relativistic calculations of 4f excitation energies in the rare-earth metals: Further results," Phys. Rev. B, 1978, 17, 3089.

Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.

Hildebrandt et al., "Producing Transportation Fuels with Less Work," Science, Mar. 27, 2009, vol. 323, pp. 1680-1681.

Hossain et al., "Chemical-looping combustion (CLC) for inherent CO2 separations—a review," Chemical Engineering Science, 2008, vol. 63, Issue 18, pp. 4433-4451.

Hua et al., "Three Dimensional Analysis of Electrical Capacitance Tomography Sensing Fields," 1999 IOP Publishing LTD, vol. 10, pp. 717-725.

Huijgen et al., "Carbon dioxide sequestration by mineral carbonation," ECN-C—03-016, www.ecn.nl/docs/library/report/200e/c03016.pdf, Feb. 2003.

Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).

Imanaka et al., "Advances in Direct NOx Decomposition Catalysts," Appl. Catal. A: Gen., 431-432, 2012, 1-8.

Ishida et al., "Evaluation of a Chemical-Looping-Combustion Power-Generation System by Graphic Exergy Analysis," Energy, 12(2), 147-154 (1987).

Iwamoto et al., "Influence of sulfur dioxide on catalytic removal of nitric oxide over copper ion-exchanged ZSM-5 Zeolite." Appl. Catal., 69(2), 1991, 15-19.

Izquierdo et al., "Catalyst Deactivation and Regeneration Processes in Biogas Tri-Reforming Process. The Effect of Hydrogen Sulfide Addition," Catalysts, 2018, 8(12): 19 pages.

Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.

Jin et al., "Development of a Novel Chemical-Looping Combustion: Synthesis of a Looping Material with a Double Metal Oxide of CoO—NiO," Energy & Fuels, 1998, vol. 12, 1272-1277.

(56) References Cited

OTHER PUBLICATIONS

Johansson et al., "Combustion of Syngas and Natural Gas in a 300 W Chemical-Looping Combustor," Chemical Engineering Research and Design vol. 2006, vol. 84, Issue 9, pp. 819-827.
Kaiser et al., "Precombustion and Postcombustion Decarbonization," IEEE, Power Engineering Review, Apr. 2001, pp. 15-17.
Kathe et al., "Modularization strategy for syngas generation in chemical ," AIChE Journal, 2017, 63(8):3343-3360.
Kathe et al., "Chemical Looping Gasification for Hydrogen Enhanced Syngas Production with in-situ CO2 Capture," United States Department of Energy, OSTI: 1185194, (2015).
Kiuchi et al., "Recovery of hydrogen from hydrogen sulfide with metals or metal sulfides," Int. J. Hydrogen Energy, 1982, 7: 477-482.
Koulialias et al., "Ordered defects in Fe 1—x S generate additional magnetic anisotropy symmetries," Journal of Applied Physics, 2018, 123(3): 033902, 10 pages.
Kresse et al., "Ab initio molecular dynamics for liquid metals," Phys. Rev. B, 1993, 47, 558.
Kresse et al., "Efficiency of ab-initio total energy calculations for metals and semiconductors using a plane-wave basis set," Comput. Mater. Sci., 1996, 6, 15-50.
Kresse et al., "Efficient iterative schemes for ab initio total-energy calculations using a plane-wave basis set," Phys. Rev. B, 1996, 54, 11169.
Kumar et al., "Direct air capture of CO2 by physisorbent materials," Angew. Chem., Int. Ed., 2015, 54, 14372-14377.
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Clean coal conversion processes—progress and challenges," The Royal Society of Chemistry, Energy & Environmental Science, Jul. 30, 2008, vol. 1, pp. 248-267.
Li et al., "Ionic Diffusion in the Oxidation of Iron-effect of Support and Its Implications to Chemical Looping Applications," Energy Environ. Sci. 2011, 4, 876-880.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AICHE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Lin et al., "Novel Magnetically Separable Mesoporous Fe2O3@SBA-15 Nanocomposite with Fully Open Mesochannels for Protein Immobilization," Chemistry of Materials, 2008, vol. 20, pp. 6617-6622.
Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.
Liu et al., "Recent Advances in Catalytic DeNOx Science and Technology," Catalysis Reviews, 48(1), 2006, 43-89.
Lockwood Greene, "Ironmaking Process Alternative Screening Study, vol. I: Summary Report," Department of Energy United States of America, Oct. 2000, 153 pages.
Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Makepeace et al., "Ammonia decomposition catalysis using non-stoichiometric lithium imide," Chem. Sci., 2015, 6, 3805.
Mamman et al., "Simultaneous steam and CO2 reforming of methane to syngas over NiO/MgO/SA-5205 in presence and absence of oxygen, " Applied Catalysis A, 1998, vol. 168, p. 33-46.
Mao et al., "Facile synthesis of phase-pure $FeCr_2Se_4$ and $FeCr_2S_4$ nanocrystals via a wet chemistry method," J. Mater. Chem. C, 2014, 2: 3744-3749.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Masui et al., "Direct Decomposition of NO into N2 and O2 Over C-type Cubic Y2O3-Tb4O7—ZrO2," Materials Sciences and Applications, 3(10), 2012, 733-738.
Mattisson et al., "Application of chemical-looping combustion with capture of CO2," Second Nordic Minisymposium on Carbon Dioxide Capture and Storage, Goeteborg, Oct. 26, 2001, pp. 46-51.
Mattisson et al., "Chemical-looping combustion using syngas as fuel," International Journal of Greenhouse Gas control, 2007, vol. 1, Issue 2, pp. 158-169.
Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.
Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products as Oxygen Carriers in Chemical-Looping Combustion," Energy & Fuels, 2009, vol. 23, pp. 2307-2315.
Mihai et al., "Chemical looping methane partial oxidation: The effect of the crystal size and O content of LaFeO3," Journal of Catalysis, 2012, 293:175-185.
Miller et al., "Toward Transformational Carbon Capture," AIChE Journal, 62, 1-10 (2016).
Moreira, "Steam Cracking: Kinetics and Feed Characterization," Dissertation, 2015, 10 pages.
NETL, National Energy Technology Laboratory. U.S. Department of Energy, "Quality Guidelines for Energy System Studies—Specification for Selected Feedstocks." Jan. 2012.
NETL, National Energy Technology Laboratory. U.S. Department of Energy, "Syngas Contaminant Removal and Conditioning," webpage accessed on Jul. 8, 2018.
Nipattummakul et al., "Hydrogen and syngas production from sewage sludge via steam gasification," Fuel and Energy Abstracts, 2010, 35 (21), 11738-11745.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.
Osha, "Hydrogen Sulfide in Workplaces," <https://www.osha.gov/SLTC/hydrogensulfide/hydrogensulfide_found.html> webpage accessed Jul. 8, 2018.

(56) References Cited

OTHER PUBLICATIONS

Pans et al., "Optimization of H2 production with CO2 capture by steam reforming of methane integrated with a chemical-looping combustion system," International Journal of Hydrogen Energy, 2013, 38(27): 11878-11892.

Park et al., "CO2 Mineral Sequestration: Chemically Enhanced Aqueous Carbonation of Serpentine, " The Canadian Journal of Chemical Engineering, 2003, vol. 81, pp. 885-890.

Park et al., "CO2 Mineral Sequestration: physically activated dissolution of serpentine and pH swing process," Chemical Engineering Science, 2004, vol. 59, pp. 5241-5247.

Perdew et al., "Generalized gradient approximation made simple," Phys. Rev. Lett., 1996, 77, 3865.

Pfeifer, "Industrial furnaces-status and research challenges," Energy Procedia, 2017, 120: 28-40.

Pröll et al., "Syngas and a separate nitrogen/argon stream via chemical looping reforming—A 140 KW pilot plant study," Fuel, 2010, vol. 89, Issue 6, pp. 1249-1256.

Qin et al., "Enhanced methane monversion in mhemical looping partial oxidation systems using a copper doping modification," Appl. Catal. B, 2018, 235, 143-149.

Qin et al., "Evolution of Nanoscale Morphology in Single and Binary Metal Oxide Microparticles During Reduction and Oxidation Processes," J. Mater. Chem. A. 2014, 2, 17511-17520.

Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.

Qin et al., "Nanostructure Formation Mechanism and Ion Diffusion in Iron-Titanium Composite Materials with Chemical Looping Redox Reactions," J. Mater. Chem. A. 2015, 3, 11302-11312.

Quin et al., "Improved Cyclic redox reactivity of lanthanum modified iron-based oxygen carriers in carbon monoxide xhemical looping combustion," Journal of Materials Chemistry A, 2017, 8 pages.

Rollmann et al., "First-principles calculation of the structure and magnetic phases of hematite," Phys. Rev. B, 2004, 69, 165107.

Rostrup-Nielsen, "Syngas in Perspective," Catalysis Today, 2002, 71(3-4), 243-247.

Ruchenstein et al., "Carbon dioxide reforming of methane over nickel/alkaline earth metal oxide catalysts," Applied Catalysis A, 1995, vol. 133, p. 149-161.

Russo et al., "Impact of Process Design of on the Multiplicity Behavior of a Jacketed Exothermic CSTR," AICHE Journal, Jan. 1995, vol. 41, No. 1, pp. 135-147.

Ryden et al., "Synthesis gas generation by chemical-looping reforming in a continuously operating laboratory reactor," Fuel, 2006, vol. 85, p. 1631-1641.

Ryden et al., "Using steam reforming to produce hydrogen with carbon dioxide capture by chemical-looping combustion," International Journal of Hydrogen Energy, 2006, 31(10): 1271-1283.

Sassi et al., "Sulfur Recovery from Acid Gas Using the Claus Process and High Temperature Air Combustion ( HiTAC ) Technology," Am. J. Environ. Sci., 2008, 4, 502-511.

Sattler et al., "Catalytic Dehydrogenation of Light Alkanes on Metals and Metal Oxides," Chem Rev, 2014, 114(20): 10613-10653.

Scott et al., "In situ gasification of a solid fuel and CO2 separation using chemical looping," AICHE Journal, 2006, vol. 52, Issue 9, pp. 3325-3328.

Shen et al., "Chemical-Looping Combustion of Biomass in a 10kWth Reactor with Iron Oxide as an Oxygen Carrier," Energy & Fuels, 2009, vol. 23, pp. 2498-2505.

Shen et al., "Experiments on chemical looping combustion of coal with a NiO based oxygen carrier," Combustion and Flame, 2009, vol. 156, Issue 3, pp. 721-728.

Sheppard et al., "Paths to which the nudged elastic band converges," J. Comput. Chem., 2011, 32, 1769-1771.

Shick et al., "Single crystal growth of $CoCr_2S_4$ and $FeCr_2S_4$," Journal of Crystal Growth, 1969, 5(4): 313-314.

Speight, "Gasification processes for syngas and hydrogen production," Gasification for Synthetic Fuel Production, Woodhead Publishing, 2015, 119-146.

Sridhar et al., "Syngas Chemical Looping Process: Design and Construction of a 25 kWth Subpilot Unit," Energy Fuels, 2012, 26(4), pp. 2292-2302.

Steinfeld et al., "Design Aspects of Solar Thermochemical Engineering—A case Study: Two-Step Water-Splitting Cycle Using the Fe3O4/FeO Redox System," Solar Energy, 1999, pp. 43-53.

Steinfeld, "Solar hydrogen production via a two-step water-splitting thermochemical cycle based on Zn/ZnO redox reactions," International Journal of Hydrogen Energy, 2002, vol. 27, pp. 611-619.

Sun et al., "Review: Fundamentals and challenges of electrochemical CO2 reduction using two-dimensional materials," Chem, 2017, 3, 560-587.

Takanabe, "Catalytic Conversion of Methane: Carbon Dioxide Reforming and Oxidative Coupling," Journal of the Japan Petroleum Institute, 2012, 55, 1-12.

Thiollier et al., "Preparation and Catalytic Properties of Chromium-Containing Mixed Sulfides," Journal of Catalysis, 2011, 197(1): 58-67.

Tian et al., "Thermodynamic investigation into carbon deposition and sulfur evolution in a Ca-based chemical-looping combustion system," Chemical Engineering Research & Design, 2011, vol. 89, Issue 9, p. 1524.

Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.

U.S. Department of Energy, NCCTI Energy Technologies Group, Office of Fossil Energy, "CO2 Capture and Storage in Geologic Formations," p. 34, Revised Jan. 8, 2002.

United States Environmental Protection Agency. "Air Pollution Control Technology Fact Sheet: Selective Catalytic Reforming," <https://www3.epa.gov/ttncatc1/cica/files/fscr.pdf> (2003).

Usachev et al., "Conversion of Hydrocarbons to Synthesis Gas: Problems and Prospects," Petroleum Chemistry, 2011, vol. 51, p. 96-106.

Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.

Vernon et al., "Partial Oxidation of Methane to Synthesis Gas," Catalysis Letters, 1990, vol. 6, p. 181-186.

Wang et al., "Highly efficient metal sulfide catalysts for selective dehydrogenation of isobutane to isobutene," ACS Catalysis, 2014, 4: 1139-1143.

Wang et al., "Isobutane Dehydrogenation over Metal (Fe, Co, and Ni) Oxide and Sulfide Catalysts: Reactivity and Reaction Mechanism," ChemCatChem, Jul. 2014, vol. 6, pp. 2305-2314.

Wang et al., "Study of bimetallic interactions and promoter effects of FeZn, FeMn and FeCr Fischer—Tropsch synthesis catalysts," Journal of Molecular Catalysis A: Chemical, 2010, 326:29-40.

Warsito, W. et al., Electrical Capacitance Volume Tomography, 2007, pp. 1-9.

Watanabe, "Electrical properties of $FeCr_2S_4$ and $CoCr_2S_4$," Solid State Communications, 1973, 12(5): 355-358.

Xu et al., "A novel chemical looping partial oxidation process for thermochemical conversion of biomass to syngas, " Applied Energy, 2018, 222:119-131.

Yamazaki et al., "Development of highly stable nickel catalyst for methane-steam reaction under low steam to carbon ratio," Applied Catalyst A, 1996, vol. 136, p. 49-56.

Yin et al., "A mini-review on ammonia decomposition catalysts for on-site generation of hydrogen for fuel cell applications," Applied Catalysis A: General, 2004, 277, 1-9.

Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.

Zeng et al., "Metal oxide redox chemistry for chemical looping processe," Nat Rev Chem., 2018, 2, 349-364.

(56) References Cited

OTHER PUBLICATIONS

International Search Report and Written Opinion for Application No. PCT/US2020/046918 dated Nov. 24, 2020 (12 pages).

European Patent Office Extended Search Report for Application No. 20855224.0 dated Jun. 20, 2023 (7 pages).

Liu et al., "Near 100% CO Selective in Nanoscaled Iron-Based Oxygen Carriers for Chemical Looping Methane Partial Oxidation," ArXiv, Cornell University Library, Olin Library Cornell University Ithaca, NY, 14853, Jun. 26, 2019, 14 pages.

Zhang et al., "Catalytic behavior and kinetic features of FeO"x? SBA-15 catalyst for selective oxidation of methane by oxygen," Applied Catalysis A: General, Elsevier, Amsterdam, NL, 2009, 356(1): 103-111.

Liu et al., "Near 100% CO selectivity in nanoscaled iron-based oxygen carriers for chemical looping methane partial oxidation," Nature Communications, 2019, 10: 5503.

* cited by examiner

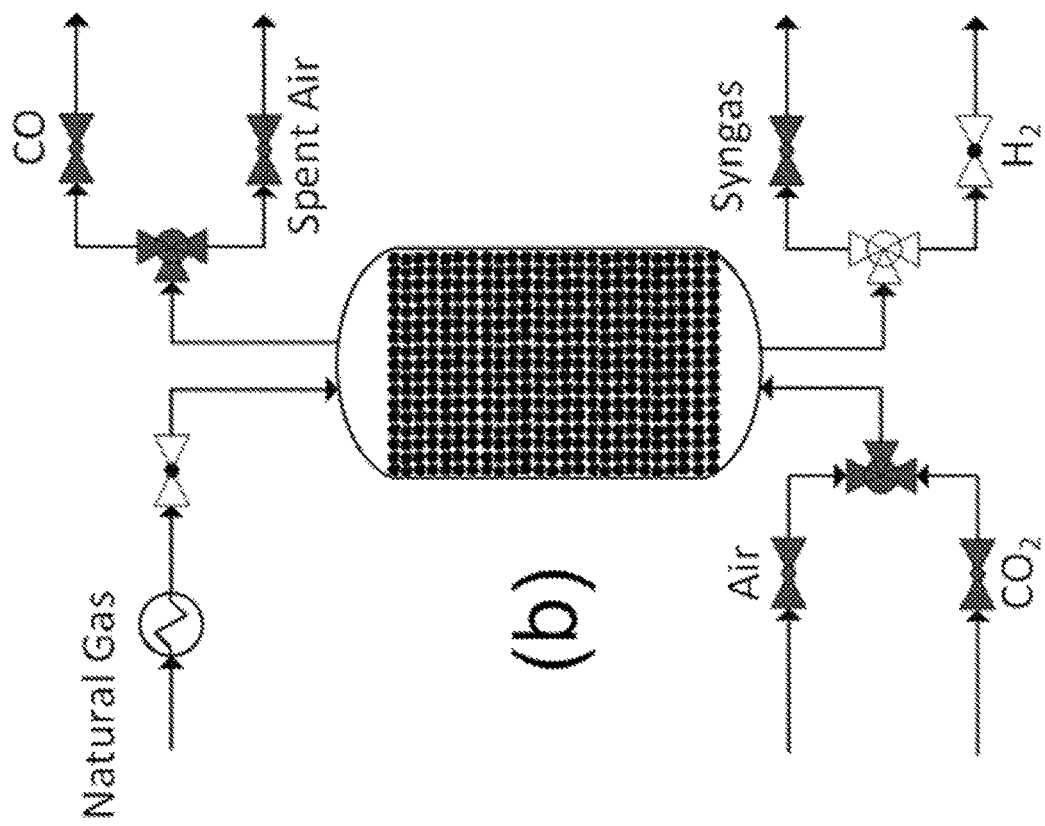
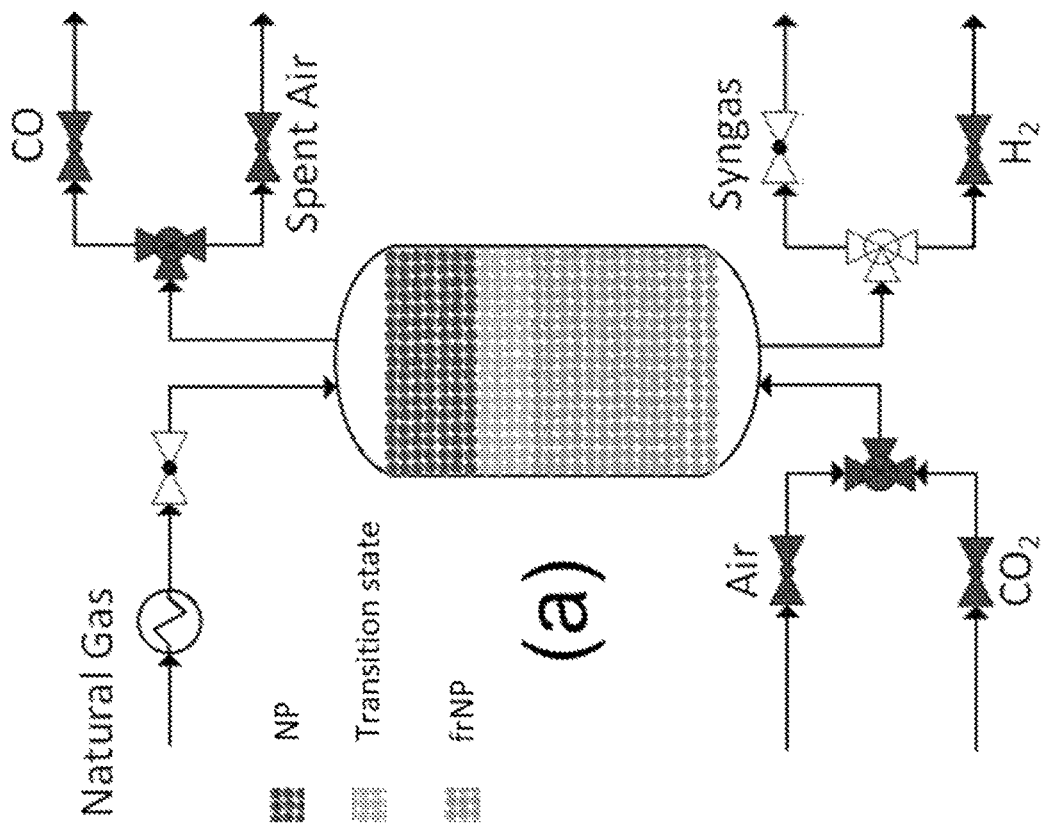
FIG. 5A
FIG. 5B

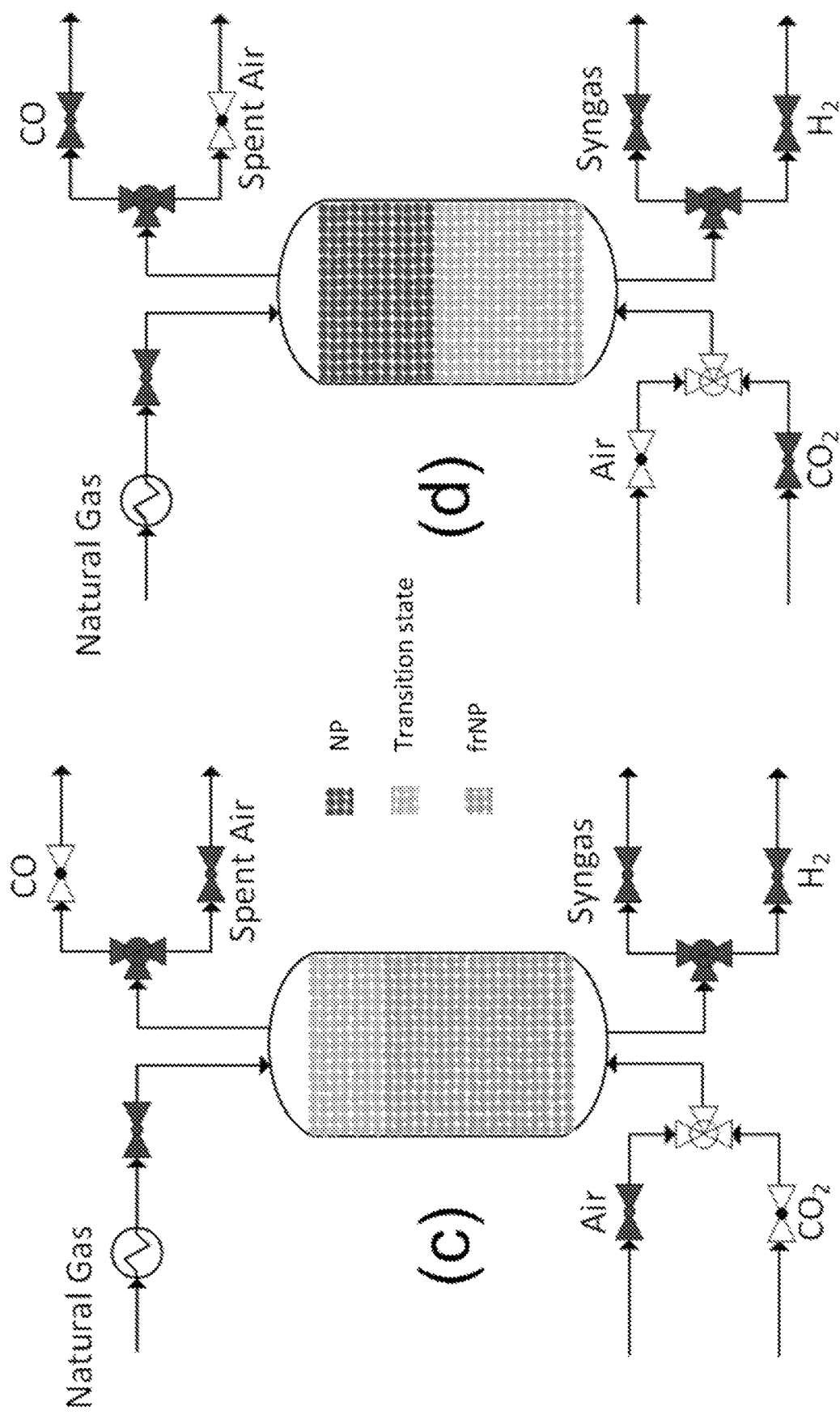

MESOPOROUS SUPPORT-IMMOBILIZED METAL OXIDE-BASED NANOPARTICLES

CROSS-REFERENCE TO RELATED APPLICATIONS

The present application is a U.S. national stage entry of International Patent Application No. PCT/US2020/046918, filed on Aug. 19, 2020, which claims priority to U.S. Provisional Patent Application No. 62/888,886, filed on Aug. 19, 2019, the entire contents each of which are fully incorporated herein by reference.

TECHNICAL FIELD

The present disclosure relates to oxygen carriers, including systems and methods for generating and using oxygen carriers. In particular, disclosed oxygen carriers comprise metal oxide-based nanoparticles immobilized on mesoporous support.

INTRODUCTION

Syngas is an important intermediate for methane conversion to high value chemicals such as gasoline, methanol, and dimethyl ether production. Conventional syngas generation is achieved through methane reforming with an oxidant over catalysts. Typically, the oxidants used are molecular oxygen, steam or $CO_2$, where these can be used separately or as mixtures in a process.

Among the syngas generation technologies, steam methane reforming (SMR) and autothermal reforming (ATR) are widely used for hydrogen production and liquid fuel production respectively. However, SMR requires excess amount of steam to attain high methane conversion and suppress coke deposition, leading to a hydrogen rich syngas stream. Thus, it requires additional reverse water-gas shift reactor and $CO_2$ separator.

ATR is currently the preferred process for producing syngas in large-scale operations. ATR uses steam and oxygen to convert methane in a single reactor. The $H_2$:CO ratio can be varied in ATR and the reaction is exothermic due to the oxidation. However, this process requires several auxiliary equipment, thus negatively affecting the overall economics of syngas generation.

Chemical looping methane partial oxidation (CLPO) is an emerging approach that overcomes the above-mentioned shortcomings for syngas production. The CLPO process involves cyclic redox reactions taking place in two interconnected reactors: a reducer (fuel reactor) and an oxidizer (air reactor).

FIG. 1 is a schematic diagram of an example chemical looping system with metal oxide ($MeO_x$) nanoparticles. The example system in FIG. 1 may be configured to process a gaseous reducing agent, such as methane, and a gaseous oxidizing agent, such as steam and/or $CO_2$, to produce syngas in the presence of metal-oxide based nanoparticle oxygen carriers. The global reaction stoichiometry is shown in Reactions A and B:

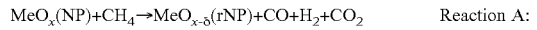
Reaction A: $MeO_x(NP) + CH_4 \rightarrow MeO_{x-\delta}(rNP) + CO + H_2 + CO_2$

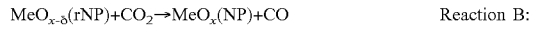
Reaction B: $MeO_{x-\delta}(rNP) + CO_2 \rightarrow MeO_x(NP) + CO$ where NP denotes nanoparticle and rNP denotes reduced nanoparticle. The gaseous reducing agent abstracts lattice oxygen from the metal oxide-based nanoparticles (as shown in Reaction A), while the oxidizing agents $CO_2$ replenish the depleted oxygen (as shown in Reaction B). The mediation of these reactions by low-coordinated lattice oxygen from the metal oxide-based nanoparticles, influences the selectivity of CO that is produced in this system.

The variation of the CO selectivity due to the mediation by the low-coordinated lattice oxygen from the metal oxide-based nanoparticles differentiates this system from the redox process with metal oxide microparticles (MP). Due to $CH_4$ and $CO_2$, adsorption energies may decrease with increasing nanoparticles size as well as low-coordinated lattice oxygen atoms on the surface of nanoparticles significantly promote metal-oxygen bond cleavage and CO formation, the reactivity and selectively of methane (or $CO_2$) to syngas production can be improved by using metal oxide-based nanoparticles. This process may eliminate the need for an air separation unit, water-gas shift reactor, and acid gas removal unit.

Extensive research has been conducted into the design and improvement of cost-effective, environmentally friendly, highly reactive, and recyclable oxygen carrier materials. Metal oxides particles containing first row transition metals such as Fe, Mn, Cu, Ni, and Co are the most extensively investigated oxygen carrying materials due to their relative abundance and suitable redox properties.

A factor recognized to influence the redox performance of oxygen carriers is particle size. However, the effect of particle size as a key operational variable on the activity and selectivity of oxygen carriers has not been closely examined, especially for nanoparticles below 10 nm in diameter. Recent investigations have revealed that nanoparticles exhibit superior redox performance at lower temperatures due to more facile lattice oxygen exchange, decreased mass resistance and increased surface area, compared to conventional micrometer-sized particles. However, the redox stress in chemical looping reactions can induce severe sintering and agglomeration.

A study on the redox reactions of $Co_3O_4$ nanoparticles (50±10 nm) reported that the surface area of the nanoparticle decreased from 26 $m^2/g$ to 0.6 $m^2/g$ and the average particle size increased from 50 nm to 500 nm within 5 redox cycles during chemical looping combustion of methane at 600° C. Therefore, nanoparticles without proper support or appropriate size cannot provide effective active sites and maintain their redox stabilities.

SUMMARY

In one aspect, an oxygen carrier is disclosed. The oxygen carrier may comprise a mesoporous support and a plurality of metal oxide-based nanoparticles immobilized on the mesoporous support. The plurality of metal oxide-based nanoparticles may comprise 10 volume percent to 80 volume percent of mesopores in the mesoporous support.

In another aspect, a method of operating a reactor is disclosed. The method may comprise providing a carbonaceous feedstock to an inlet of the reactor, providing oxygen carrier particles within the reactor, and collecting a product stream from an outlet of the reactor, the product stream including at least one of: $H_2$, carbon monoxide (CO), and $C_{2+}$ hydrocarbon. Exemplary oxygen carrier particles may comprise a mesoporous support and a plurality of metal oxide-based nanoparticles immobilized on the mesoporous support. The plurality of metal oxide-based nanoparticles may comprise 10 volume percent to 80 volume percent of mesopores in the mesoporous support.

In another aspect, a reactor is disclosed. The reactor may comprise a feedstock inlet in fluid communication with a carbonaceous feedstock source, a product stream outlet, and oxygen carrier particles. Exemplary oxygen carrier particles may comprise a mesoporous support and a plurality of metal oxide-based nanoparticles immobilized on the mesoporous support. The plurality of metal oxide-based nanoparticles may comprise 10 volume percent to 80 volume percent of mesopores in the mesoporous support.

There is no specific requirement that a material, technique or method relating to oxygen carriers include all of the details characterized herein, in order to obtain some benefit according to the present disclosure. Thus, the specific examples characterized herein are meant to be exemplary applications of the techniques described, and alternatives are possible.

BRIEF DESCRIPTION OF THE DRAWINGS

In FIG. 2B, the metal oxide microparticles on the top of the reactor is substituted by metal oxide-based nanoparticles (NP).

FIG. 5A-FIG. 5D show a syngas generation system with four steps in a fixed bed, where valves indicated in white are open and valves indicated in gray are closed. FIG. 5A shows a first step to produce high purity syngas from natural gas; FIG. 5B shows a second step to produce pure hydrogen by natural gas cracking; FIG. 5C shows a third step for $CO_2$ conversion to CO; FIG. 5D shows a fourth step for the regeneration of metal oxide-based nanoparticles. (Red valves indicates close, green valves indicates open). In this diagram, red dot represents metal oxide-based NP, grey dot indicates fully reduced metal oxide-based nanoparticles (frNP), yellow dot indicates the transition state, and the black dot represents carbon deposition on the fully reduced nanoparticles.

FIG. 13B: with 1% oxygen vacancy).

FIG. 22A shows diffusivity with uniform particle size. FIG. 22B shows diffusivity with varying particle size obeying the cut-off normal distribution in section [5 nm, 7.98 nm] for SBA-15 and [3 nm, 6 nm] for SBA-16.

DETAILED DESCRIPTION

Figure 1:
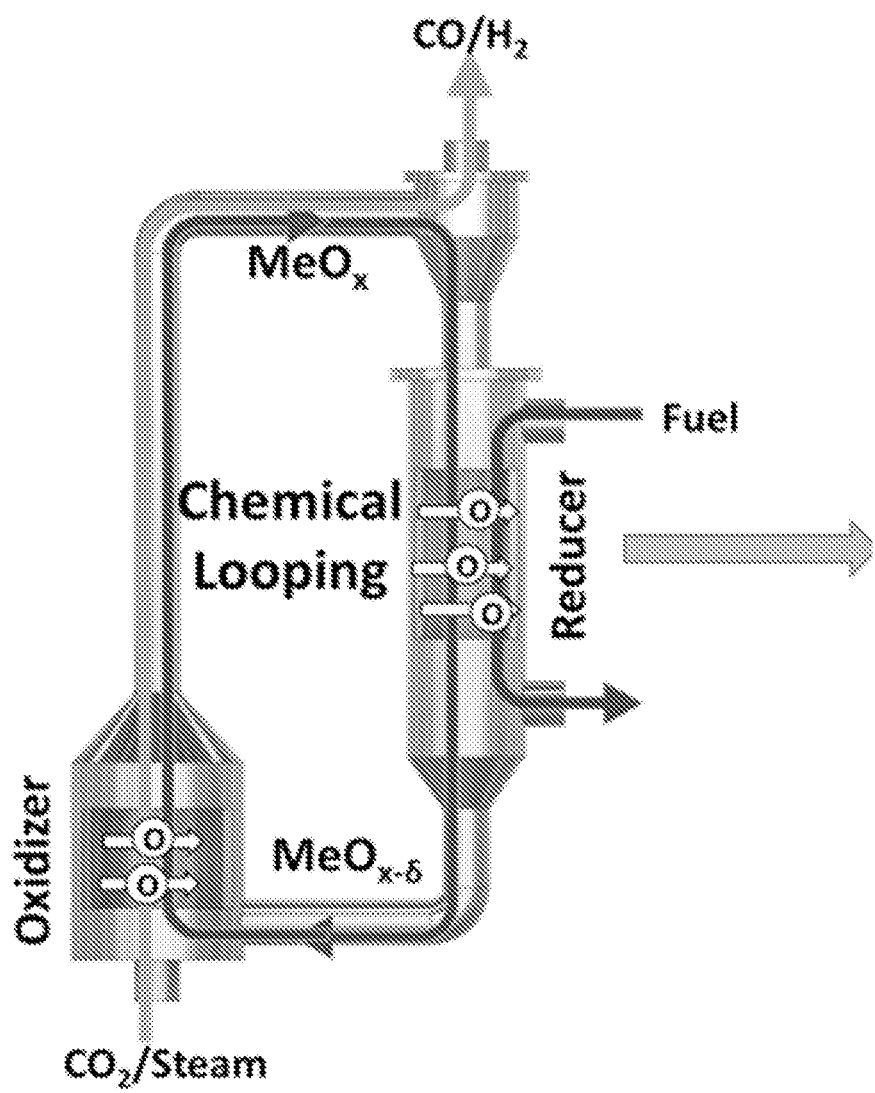
FIG. 1 shows a schematic diagram of a chemical looping system configured for a partial oxidation process.

Broadly, the instant disclosure relates to oxygen carriers as well as systems and methods for making and using oxygen carriers. Generally, disclosed oxygen carriers include metal oxide-based nanoparticles immobilized on mesoporous support. Exemplary oxygen carriers may be particularly suited for use in chemical looping systems, which may be configured for syngas generation.

Syngas ($CO+H_2$) is an essential building block for synthesis of fuels or value-added chemicals. Methane ($CH_4$) to syngas production has been commercialized by steam reforming, auto-thermal reforming, and partial oxidation of methane for many decades. However, an improvement of its energy consumption, environmental impact, operation safety and associated production cost has always been desirable. Moreover, the highest syngas selectivity achieved in the state-of-the-art processes is only ~90%. It is of particular interest to obtain higher selectivity. One challenge for nanoscale transition metal oxides is stability, which may impact the oxides' ability to maintain high activity under chemical looping operations. One disclosed approach to stabilize nanoscale transition metal oxide nanoparticles is dispersing the transition metal oxide-based nanoparticles on mesoporous inert support.

Combining the concept of chemical looping technology with metal oxide-based nanoparticles such as iron oxide nanoparticle can provide an alternative way for high purity syngas generation, which increases the economics of gaseous hydrocarbon to syngas generation by eliminating the post separation system. Exemplary oxygen carriers may inherently change the thermodynamic kinetics of a chemical looping system, allowing for higher syngas generation efficiencies.

Experimental results indicate that metal oxide-based nanoparticles immobilized on mesoporous support can be applied as highly active and stable oxygen carriers for syngas generation in chemical looping systems, and enable pure syngas selectivity in multiple reactor configurations, which is so far the highest value in syngas production directly from methane. Moreover, the effective temperature for syngas generation in chemical looping system with nanoparticles is lowered to 750° C. to 935° C., which is over 100° C. lower than current state-of-the-art processes. Nanostructured oxygen carriers are presented to exhibit little high-temperature reactivity property deterioration and adaptability to broader temperature operating windows for chemical looping operation conditions. These findings contribute to a nanoscale understanding of the metal oxide redox chemistry and provide potential systematic strategy towards the design of pure syngas generation systems with superior economics efficiency.

I. Exemplary Oxygen Carrier Particles

Broadly, exemplary oxygen carrier particles include metal oxide-based nanoparticles immobilized on a mesoporous support. Various aspects of exemplary oxygen carrier particles are discussed below, such as chemical constituents, amounts of possible constituents, and physical properties of exemplary oxygen carrier particles.

A. Example Chemical Constituents and Amounts of Exemplary Oxygen Carrier Particles Exemplary mesoporous supports include structures that immobilize metal oxide-based nanoparticles. Various mesoporous materials, such as mesoporous silica materials, may be used. In various implementations, example mesoporous support may be Santa Barbara Amorphous-15 silica (SBA-15), Santa Barbara Amorphous-16 silica (SBA-16), mesoporous silica MCM-41, mesoporous silica MCM-48, titanium oxide ($TiO_2$), Technische Universiteit Delft-1 (TUD-1), Hiroshima Mesoporous Material-33 (HMM-33), folded sheets mesoporous material 16 (FSM-16), zirconium oxide ($ZrO_2$), or aluminum oxide ($Al_2O_3$). In some instances, more than one type of mesoporous support is used to immobilize metal oxide-based nanoparticles.

Exemplary metal oxide-based nanoparticles may include one or more metal oxides. For instance, metal oxide-based nanoparticles may include iron oxide ($Fe_2O_3$), nickel oxide (NiO), copper oxide (CuO), ferrite, cobalt oxide and spinels, perovskites, or combinations thereof.

In some instances, exemplary metal oxide-based nanoparticles may include dopant. A catalytic aliovalent or isovalent metal dopant can provide extra reaction sites during $CO_2$ and $CH_4$ conversion in addition to the host transition metal oxide-based nanoparticles. In some implementations, exemplary metal oxide-based nanoparticles may include more than one dopant. Example dopants that may be incorporated into metal oxide-based nanoparticles include: iron (Fe), cobalt (Co), nickel (Ni), copper (Cu), scandium (Sc), titanium (Ti), vanadium (V), chromium (Cr), manganese (Mn), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lutetium (Lu), hafnium (Hf), tantalum (Ta), tungsten (W), rhenium (Re), osmium (Os), iridium (Ir), platinum (Pt), gold (Au), and lanthanum (La).

Active sites on metal oxide-based nanoparticles can lower a reaction energy barrier of $CO_2$ or $CH_4$ activation, and facilitate formation of carbon monoxide (CO). Thus, the use of metal oxide-based nanoparticles immobilized on mesoporous support as oxygen carriers can achieve higher target product selectivity at lower temperatures in chemical looping redox reactions with carbonaceous fuels, such as partial oxidation of $C_mH_n$, combustion of $C_mH_n$, selective oxidation of $C_mH_n$, and carbon dioxide reforming of methane to produce power, fuels, chemicals (syngas, $H_2$ or value-added chemicals) and materials. Exemplary metal oxide-based nanoparticles may also be compatible with the design of existing reactors such as fixed bed, moving bed and fluidized bed.

An amount of metal oxide-based nanoparticles immobilized on mesoporous support may be characterized in terms of a volume percent of mesopores in the mesoporous support. The pore volume of mesoporous material is determined by BET. The volume percent is determined by:

$$\text{volume percentage} = \frac{V_{metaol\ oxide}}{V_{mesoporous\ material}}$$

where $V_{metal\ oxide}$ is the volume of metal oxide, and $V_{mesoporous\ material}$ is the pore volume of mesoporous support.

Exemplary metal oxide-based nanoparticles may comprise 10 volume percent to 80 volume percent of the mesopores in the mesoporous support. In various implementations, metal oxide-based nanoparticles may comprise no less than 10 volume percent; no less than 20 volume percent; no less than 30 volume percent; no less than 40 volume percent; no less than 50 volume percent; no less than 60 volume percent; or no less than 70 volume percent of the mesopores in the mesoporous support. In various implementations, metal oxide-based nanoparticles may comprise 10 volume percent to 80 volume percent; 20 volume percent to 70 volume percent; 30 volume percent to 60 volume percent; 10 volume percent to 40 volume percent; 40 volume percent to 80 volume percent; 10 volume percent to 30 volume percent; 30 volume percent to 50 volume percent; or 50 volume percent to 80 volume percent of the mesopores in the mesoporous support.

An amount of metal oxide-based nanoparticles immobilized on mesoporous supports may be characterized in terms of a weight percent of mesopores in the mesoporous support. In these terms, metal oxide-based nanoparticles may comprise 22 weight percent to 86 weight percent of mesopores in the mesoporous support. In various implementations, metal oxide-based nanoparticles may comprise at least 22 weight percent; at least 30 weight percent; at least 40 weight percent; at least 50 weight percent; at least 60 weight percent; at least 70 weight percent; or at least 80 weight percent of mesopores in the mesoporous support. In various implementations, metal oxide-based nanoparticles may comprise 22 weight percent to 86 weight percent; 30 weight percent to 80 weight; 40 weight percent to 70 weight percent; 25 weight percent to 50 weight percent; 50 weight percent to 86 weight percent; 22 weight percent to 40 weight percent; 40 weight percent to 60 weight percent; or 60 weight percent to 86 weight percent of mesopores in the mesoporous support.

As mentioned above, dopant is an optional addition to exemplary metal oxide-based nanoparticles. When present, dopant may be included at various amounts in exemplary metal oxide-based nanoparticles. For instance, exemplary metal oxide-based nanoparticles may comprise 0.5 atomic percent (at %) to 15 at % dopant. In various implementations, exemplary metal oxide-based nanoparticles may comprise 0.5 at % to 12 at % dopant; 3 at % to 15 at % dopant; 3 at % to 12 at % dopant; 0.5 at % to 8 at % dopant; 8 at % to 15 at % dopant; 0.5 at % to 10 at % dopant; 5 at % to 10 at % dopant; 0.5 at % to 4 at % dopant; 4 at % to 8 at % dopant; 8 at % to 12 at % dopant; or 12 at % to 15 at % dopant.

B. Example Physical Characteristics of Exemplary Oxygen Carrier Particles

Exemplary oxygen carrier particles have various physical characteristics, and selected physical characteristics are discussed below.

Exemplary metal oxide-based nanoparticles may be sized based on pore size of the mesoporous support such that a maximum diameter is within the pore size of the mesoporous support. In some implementations, exemplary metal oxide-based nanoparticles may have an average diameter of 2 nm to 50 nm. In some instances, exemplary metal oxide-based nanoparticles may have an average diameter of no greater than 50 nm; no greater than 40 nm; no greater than 30 nm; no greater than 20 nm; or no greater than 10 nm. In various implementations, exemplary metal oxide-based nanoparticles may have an average diameter of 2 nm to 50 nm; 2 nm to 25 nm; 2 nm to 10 nm; 4 nm to 30 nm; 30 nm to 50 nm; 4 nm to 17 nm; 17 nm to 30 nm; 4 nm to 10 nm; 10 nm to 16 nm; 16 nm to 23 nm; 23 nm to 30 nm; 6 nm to 10 nm; 4 nm to 8 nm; 4 nm to 9 nm; 5 nm to 10 nm; or 7 nm to 10 nm.

Exemplary mesoporous supports may have various sizes. For instance, exemplary mesoporous supports may have an average diameter of about 200 nm to about 150 µm. In various implementations, exemplary mesoporous supports may have an average diameter of about 200 nm to 1 µm; 1 µm to 150 µm; 200 nm to 500 nm; 500 nm to 1 µm; 1 µm to 50 µm; 50 µm to 100 µm; or 100 µm to 150 µm.

Exemplary mesoporous supports may have various pore diameters. For instance, exemplary mesoporous supports may have an average pore diameter of about 2 nm to about 50 nm. In some instances, exemplary mesoporous supports may have an average pore diameter of no greater than 50 nm; no greater than 40 nm; no greater than 30 nm; no greater than 20 nm; or no greater than 10 nm. In various implementations, exemplary mesoporous supports may have an average pore diameter an average diameter of 2 nm to 50 nm; 2 nm to 25 nm; 2 nm to 10 nm; 4 nm to 30 nm; 30 nm to 50 nm; 4 nm to 17 nm; 17 nm to 30 nm; 4 nm to 10 nm; 10 nm to 16 nm; 16 nm to 23 nm; 23 nm to 30 nm; 6 nm to 10 nm; 4 nm to 8 nm; 4 nm to 9 nm; 5 nm to 10 nm; or 7 nm to 10 nm.

II. Exemplary Methods of Making Oxygen Carrier Particles

Exemplary oxygen carrier particles may be synthesized by any suitable method including, but not limited to, sonication, wet milling, extrusion, pelletizing, freeze granulation, co-precipitation, wet-impregnation, sol-gel, and mechanical compression.

An example method may begin by dissolving metal oxide nanoparticles in ethanol. After dissolution, mesoporous support material may be added to the solution and the resulting mixture agitated for a predetermined period of time. As examples, the mixture may be agitated for 30 minutes; 45 minutes; 1 hour; 75 minutes; 90 minutes; 105 minutes; or 2 hours. In some implementations, mixing of the mixture may be accomplished using ultrasonic treatment.

After agitation, the resulting suspension may be vigorously stirred for a predetermined period of time. As examples, vigorous stirring may be performed for 1 hour; 2 hours; 4 hours; 6 hours; 8 hours; 10 hours; 12 hours; or 14 hours.

Then a solid precursor product may be collected using a suitable method to remove a top solution, such as by pipette, and dried in air. In some instances, air drying may occur at room temperature to 200° C. In various implementations, air drying may occur at 20° C. to 200° C.; 20° C. to 100° C.; 100° C. to 200° C.; 50° C. to 125° C.; 75° C. to 200° C.; 20° C. to 40° C.; 40° C. to 80° C.; 80° C. to 120° C.; 120° C. to 160° C.; or 160° C. to 200° C.

A duration of air drying may be selected based on a temperature during air drying. In some instances, air drying may occur for less than 2 hours; less than 90 minutes; less than 60 minutes; or less than 30 minutes. In various instances, air drying may occur for 30 to 120 minutes; 60 to 120 minutes; 90 to 120 minutes; or 105 to 120 minutes.

After drying, the solid precursor product may be calcined to obtain the oxygen carrier particles. In various implementations, calcination may be conducted at 500° C. to 800° C. As examples, calcination may be conducted at 500° C. to 800° C.; 500° C. to 700° C.; 500° C. to 600° C.; 600° C. to 700° C.; 700° C. to 800° C.; or 550° C. to 750° C. A duration of calcination may be selected based on calcination temperature. For instance, calcination may be performed for 2 hours to 6 hours. In various instances, calcination may be performed for 2 hours to 6 hours; 2 hours to 5 hours; 3 hours to 6 hours; 2 hours to 4 hours; 4 hours to 6 hours; 2 hours to 3 hours; 3 hours to 4 hours; 4 hours to 5 hours; or 5 hours to 6 hours.

III. Exemplary Reactor Systems and Methods of Operation

Exemplary oxygen carrier particles may be applied to a variety of techniques. For instance, exemplary oxygen carrier particles may be used during reactor operation.

Figures 2A, 2B:
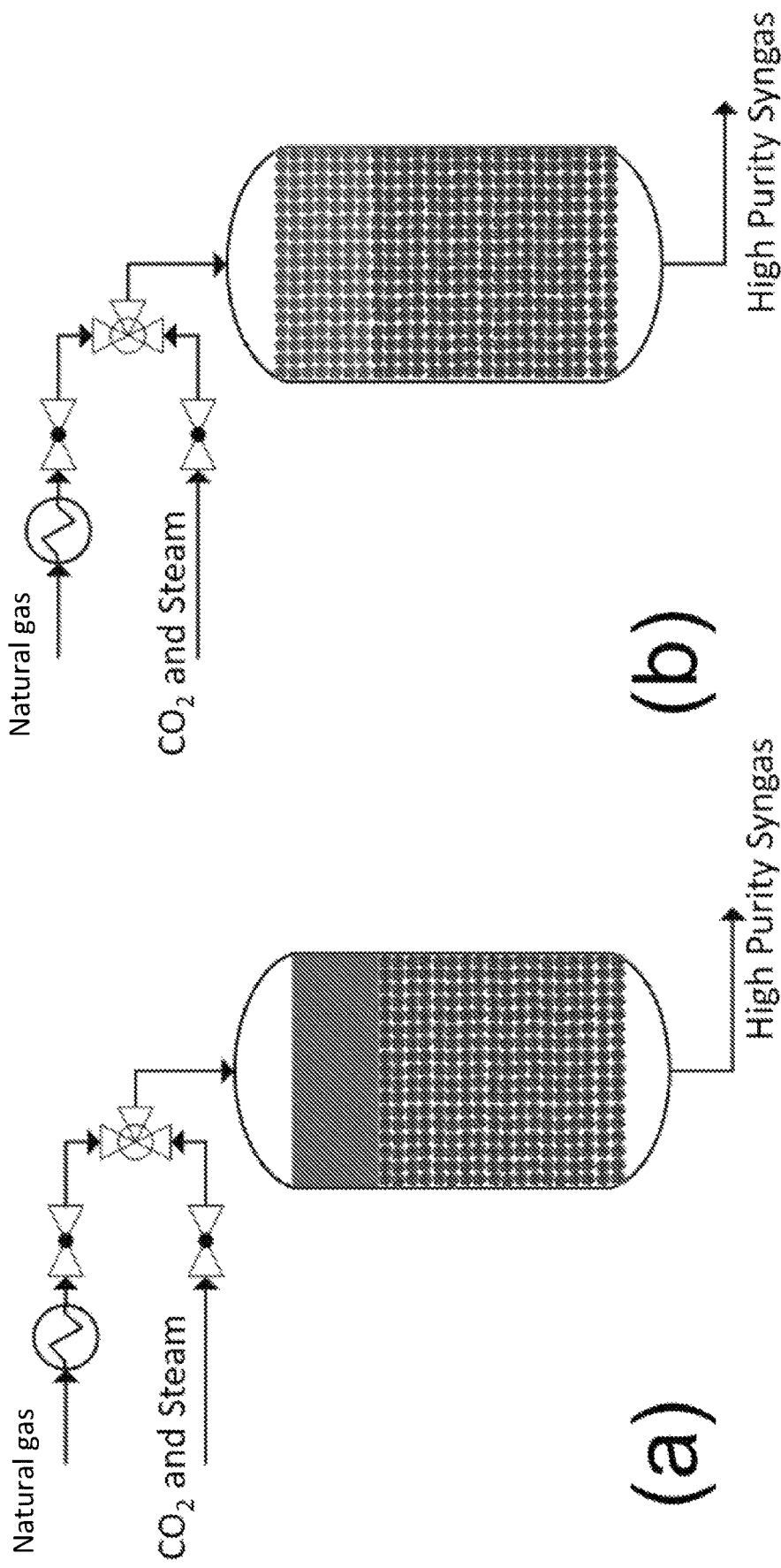
FIG. 2A and FIG. 2B show syngas generation systems by using natural gas and steam or $CO_2$ as the feedstock. The reactor configuration in FIG. 2A has the metal oxide microparticles (MP) on the top of the reactor and the reduced metal oxide nanoparticles (rNP) on the bottom of the reactor.

FIG. 2A and FIG. 2B show a schematic diagram of example embodiments of a reactor, which may comprise a feedstock inlet and a product stream outlet. The feedstock inlet may be in fluid communication with a carbonaceous feedstock source, such as natural gas. The feedstock inlet may also be in fluid communication with an oxidizing source, such as $CO_2$ and/or steam.

The reactor may also comprise oxygen carrier particles as described herein. For instance, oxygen carrier particles may comprise a mesoporous support and a plurality of metal oxide-based nanoparticles immobilized on the mesoporous support. In some instances, the plurality of metal oxide-based nanoparticles comprise 10 volume percent to 80 volume percent of mesopores in the mesoporous support.

Figure 3:
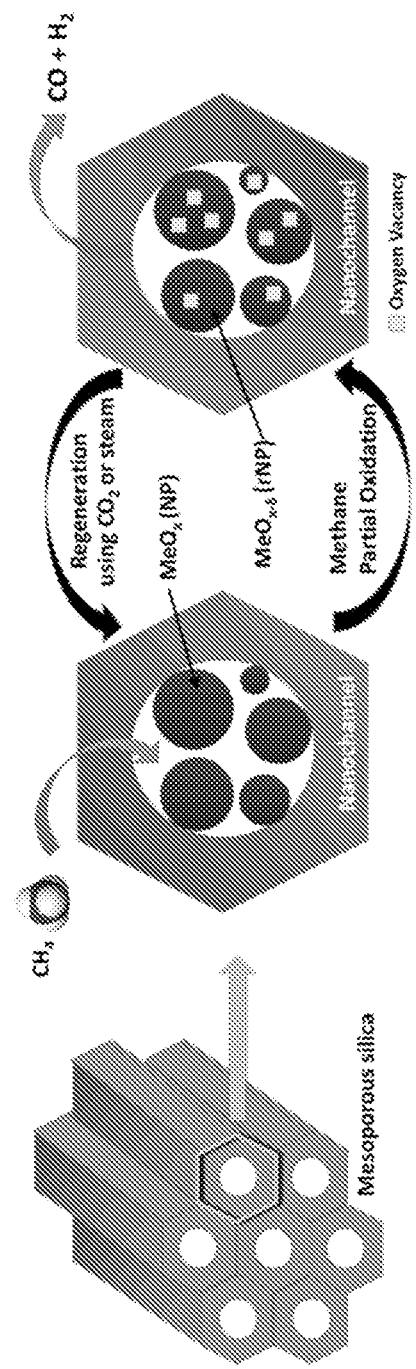
FIG. 3 shows a schematic diagram of metal oxide-based nanoparticles immobilized on mesoporous support.

In some instances, exemplary oxygen carrier particles may be positioned at the bottom of the reactor. Either metal oxide microparticles (MP) or metal oxide nanoparticles (NP) on mesoporous supports can be at the top of the reactor. $CH_4$ and $CO_2$ can be injected from top of the reducer with a desired ratio. As natural gas flows from the top of the reactor, the lattice oxygen from metal oxide macroparticles or metal oxide nanoparticles may be abstracted to oxidize the methane to $CO_2$ content syngas. Then, the reduced metal oxide-based nanoparticles (rNP) can further reduce $CO_2$ to CO. These aspects are shown schematically in FIG. 3.

An embodiment of an example method for operating a reactor may begin by providing a carbonaceous feedstock to an inlet of the reactor. In various implementations, a carbonaceous feedstock conversion may be greater than 95%; greater than 96%; greater than 97%; greater than 98%; or greater than 99%. Carbonaceous feedstock conversion may be defined as:

$$\text{conversion} = 1 - \frac{n_{fuel,o}}{n_{fuel,i}}$$

where $n_{fuel,o}$ is the total mole of fuel in outlet and $n_{fuel,i}$ is the total mole of fuel in inlet.

The example method may also include providing oxygen carrier particles within the reactor. Exemplary oxygen carrier particles as described herein may be used, and may comprise a mesoporous support and a plurality of metal oxide-based nanoparticles immobilized on the mesoporous support. In some instances, the plurality of metal oxide-based nanoparticles comprise 10 volume percent to 80 volume percent of mesopores in the mesoporous support. The example method may also include collecting a product stream from an outlet of the reactor, where the product stream may include one or more of $H_2$, syngas and $C_{2+}$ hydrocarbon.

In various implementations, the reactor may be arranged as a fixed bed, a moving bed, or a fluidized bed. Depending on the configuration, the example method may additionally comprise providing the oxygen carrier particles to a second reactor where one or more oxidizing reactions may occur.

In some instances, the exemplary method may include, after collecting the product stream, providing an oxidizing agent to the inlet of the reactor. Exemplary oxidizing agents may include steam, carbon dioxide ($CO_2$), air, and combinations thereof. The exemplary method may also include collecting a second product stream from the outlet of the reactor, the second product stream including carbon monoxide (CO). In some instances, the second product stream may include one or more of: hydrogen ($H_2$), steam, carbon monoxide (CO), carbon dioxide ($CO_2$), nitrogen ($N_2$), and oxygen ($O_2$).

Exemplary reactors may be operated at various temperatures, such as from room temperature to 1200° C. In various implementations, exemplary reactors may be operated at 200° C. to 1200° C.; 200° C. to 600° C.; 600° C. to 1000° C.; 800° C. to 1200° C.; 400° C. to 800° C.; 500° C. to 900° C.; 400° C. to 600° C.; 600° to 800° C.; 500° C. to 700° C.; 400° C. to 500° C.; 500° C. to 600° C.; 600° C. to 700° C.; 700° C. to 800° C.; or 800° C. to 900° C. Exemplary reactors may be operated at about atmospheric pressure. In some implementations, exemplary reactors may be operated at 1 bar.

Figure 4:
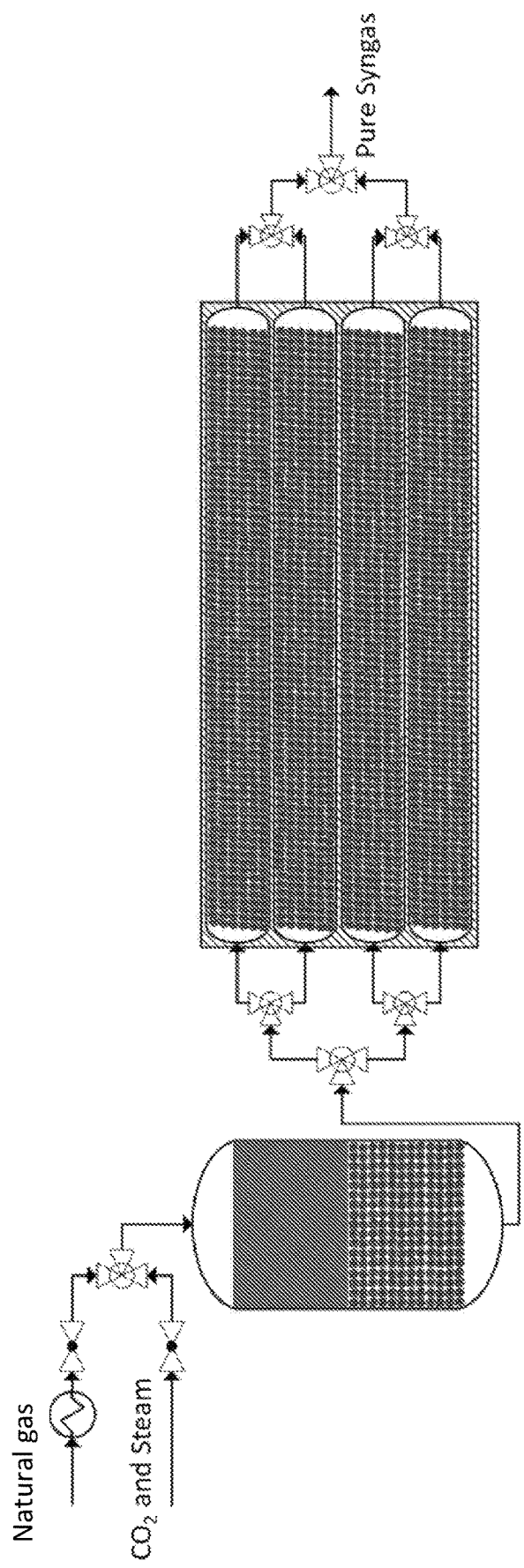
FIG. 4 shows a schematic configuration of a syngas generation and purification system.
Figure 6:
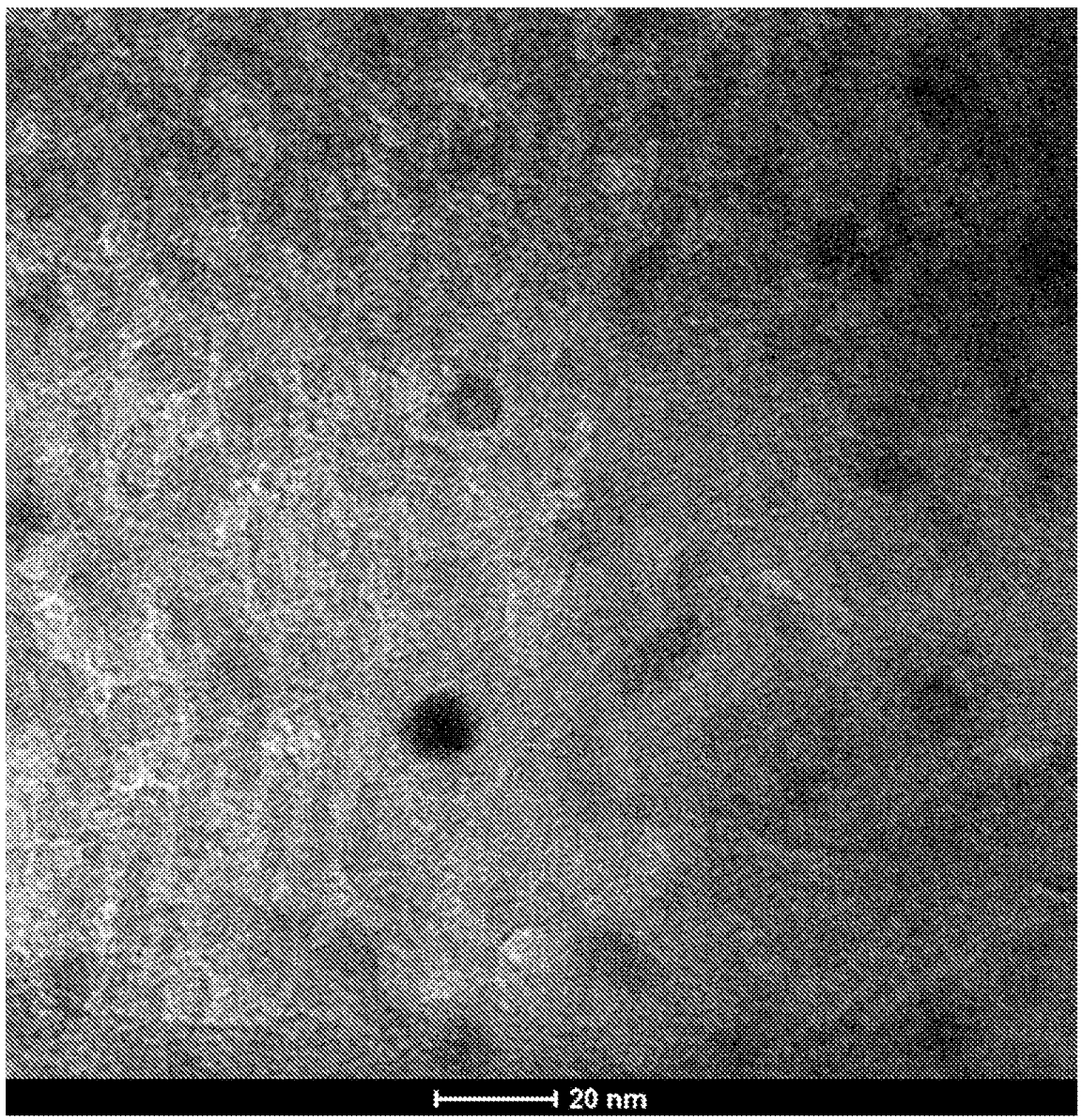
FIG. 6 is a TEM image of fresh $Fe_2O_3$@SBA-15 sample.

FIG. 4 shows a schematic configuration of the reactor system shown in FIG. 2A with a syngas purification system added downstream of the syngas generation system. With the combination of these two systems, pure syngas can be generated from natural gas.

FIG. 5A-FIG. 5D show a schematic configuration for metal oxide-based nanoparticles utilization in a four-step syngas generation systems. In this system, the syngas generation includes four steps, which are shown in the following reactions (1)-(4):

$$MeO_x(NP) + CH_4 \rightarrow MeO_{x-\delta}(rNP) + CO + 2H_2 \quad (1)$$

$$CH_4 \rightarrow C + 2H_2 \quad (2)$$

$$MeO_{x-\delta}(rNP) + CO_2 + C \rightarrow MeO_{x-\beta}(rNP) + CO \quad (3)$$

$$MeO_{x-\beta}(rNP) + Air \rightarrow MeO_x(NP) \quad (4)$$

In the first step (FIG. 5A), natural gas (methane) will be injected from the top of the reactor. The metal oxide-based nanoparticles will provide the lattice oxygen for $CH_4$ conversion to CO.

In the second step (FIG. 5B), the metal oxide-based nanoparticles will be fully reduced, and natural gas will be cracked into $H_2$ and carbon. The cracking results in carbon deposition on the nanoparticles where pure $H_2$ can be obtained from the outlet of the reactor. When the conversion of the natural gas starts to decrease, indicating saturated carbon deposition on the nanoparticles, $CO_2$ can be injected from bottom as the third step (FIG. 5C). In this step, carbon will be converted to CO. Meanwhile, the fully reduced nanoparticles (frNP) will be partially oxidized. Finally (FIG. 5D), the air will be injected from the bottom to fully oxidize the metal oxide nanoparticles. Thus, this four-step configuration can be considered in a generalized form wherein metal oxide nanoparticles undergo redox cycles to produce syngas, pure $H_2$ and pure CO together in one configuration.

IV. Experimental Examples

Experimental examples were conducted, and various aspects are discussed below.

A. Experimental Oxygen Carrier Particles Preparation and Characterization

Iron oxide nanoparticles were synthesized by one-pot wet impregnation method. To prepare the solution for wet impregnation, $Fe(NO_3)_3 \cdot xH_2O$ and surfactant were dissolved into ethanol. SBA-15 was stirred in the solution. The aforementioned solution was stirred for 20~28 hrs at room temperature, which was followed by a powderization at 80~200° C. and calcination at 500~700° C. Transmission electron microscope was used to characterize the morphology of the sample. All the TEM images were obtained with FEI Tecnai G2 30. FIG. 5 shows the TEM images of iron oxide nanoparticles. The image in FIG. 5 indicates that ~10 nm nanoparticles are embedded in SBA-15 nanochannels. FIG. 5 illustrates the success of iron oxide nanoparticles dispersion by aforementioned methods.

Figure 7:
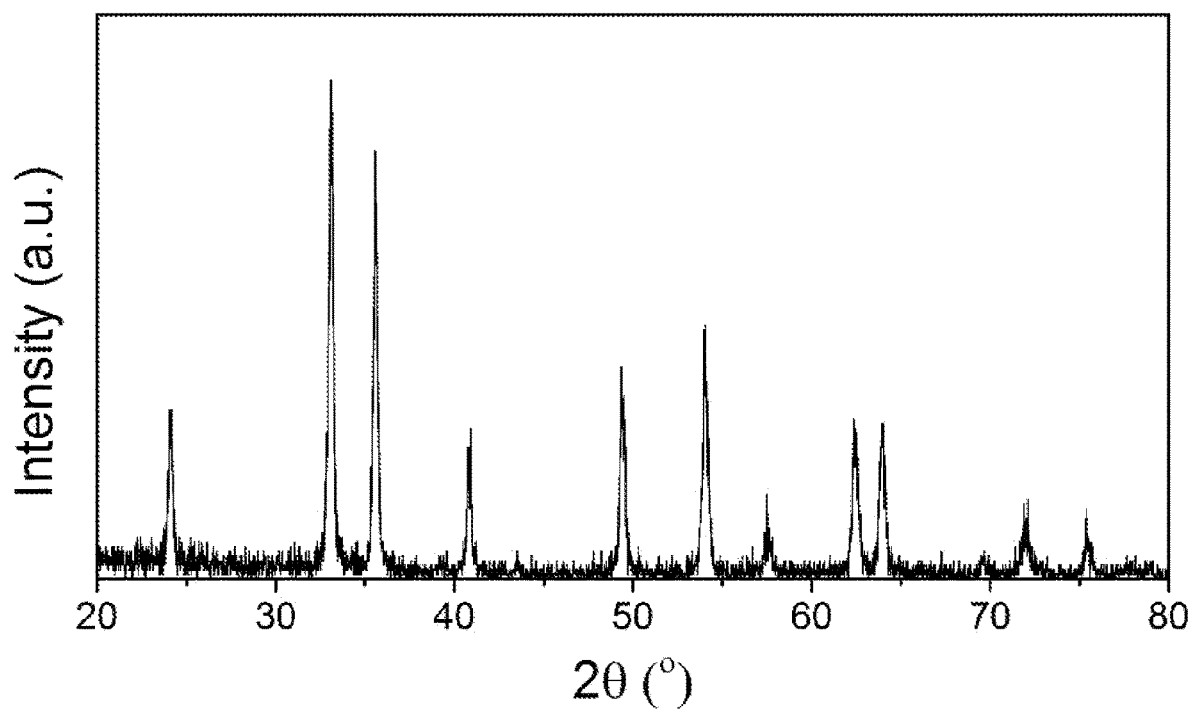
FIG. 7 is an XRD pattern of mesoporous supported iron oxide nanoparticles.

The fabricated samples were also characterized using a Rigaku SmartLab X-ray Diffractometer (XRD) with eliminated fluorescence. The analysis and identification of all XRD was accomplished with PDXL software and the JCPDS database. During the instrument characterization, scans were conducted from 20 to 80 degrees, at a rate of 1° per minute with accelerating voltage and filament current of 40 kV and 44 mA, respectively. The XRD image of mesoporous supported iron oxide nanoparticles is shown in FIG. 7. The pattern of XRD indicates the rhombohedral $Fe_2O_3$ structure. No other phases were detected due to the amorphous properties of SBA-15 and homogenous mixing and completion of wet impregnate method.

Figure 8:
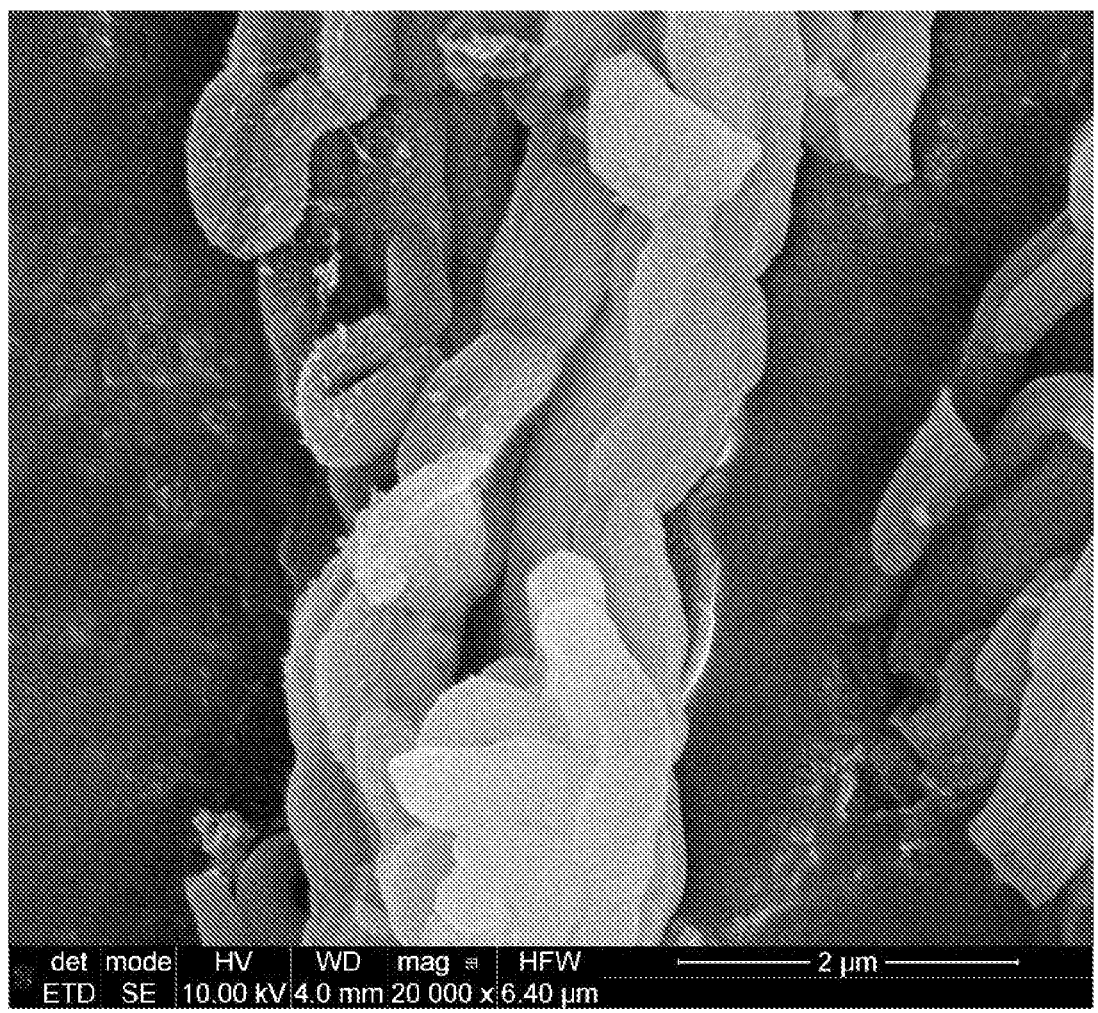
FIG. 8 is an SEM image of $Fe_2O_3$@SBA-15, where a thin layer of Au was sputtered on the surface for imaging purposes.

The morphology of experimental iron oxide nanoparticles were examined by a scanning electron microscope (SEM) with a 10 kV and 0.17 nA electron beam. Secondary electron images were obtained with a working distance around 4.1 mm. As shown in FIG. 8, silica bundles and were observed under SEM and minimal $Fe_2O_3$ nanoparticles can be seen on the surface.

The reactivity of iron oxide nanoparticles and copper doped iron oxide nanoparticles were tested in a SETARAM thermogravimetric analysis (TGA) device. A 20 mg sample was mounted on the TGA, and heated from the room temperature to 900° C. with a ramping rate of 10° C./min. 50 mL/min of $CH_4$ balanced with 150 mL/min of Helium was used in the operation. The conversion of the iron oxide nanoparticles and doped iron oxide nanoparticles was calculated by equation as the following:

$$\text{Conversion}(Fe_2O_3) = \frac{\Delta m}{m_{Fe_2O_3} \times 30\%}$$

where $\Delta m$ is the weight change during redox cycle, $m_{Fe_2O_3}$ is the weight of $Fe_2O_3$ in the total sample, and 30% is the weight percentage of oxygen in $Fe_2O_3$. Differentiating thermo gravity (DTG) value are divided by the total mass of available oxygen in the experimental iron oxide nanoparticles to have better comparison for different samples.

Figures 9A, 9B:
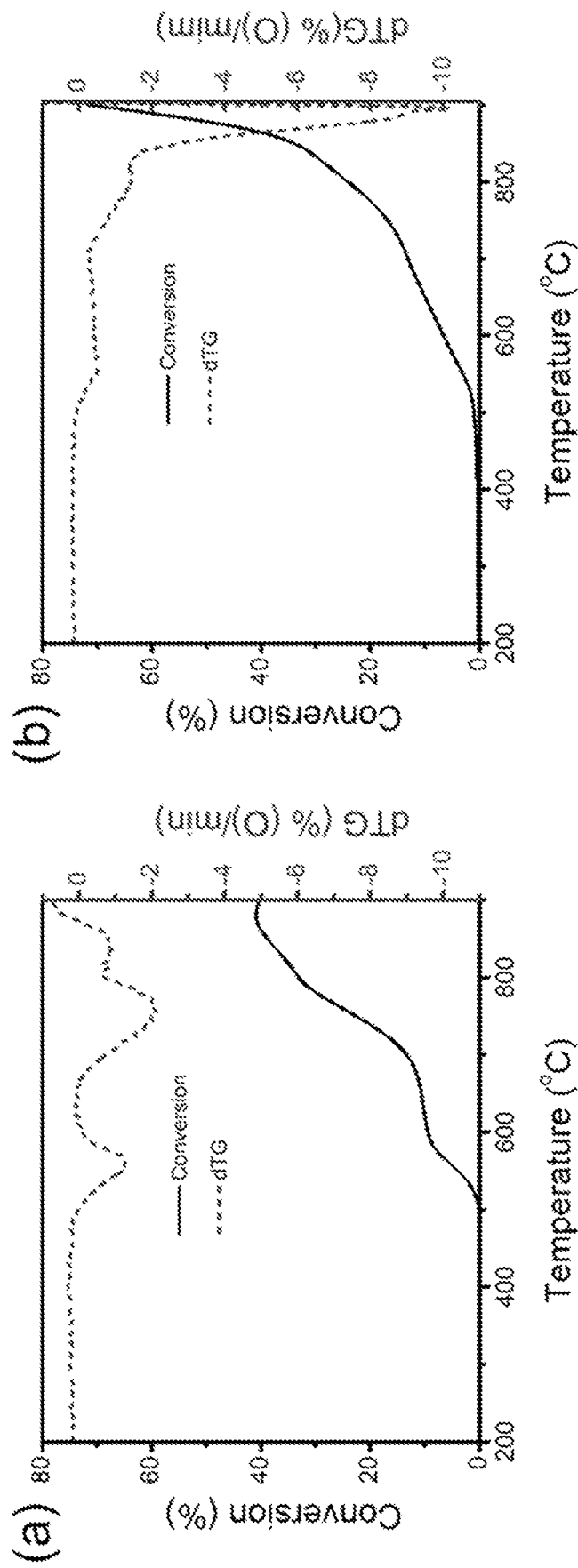
FIG. 9A and FIG. 9B show temperature programmed reaction (TPR) results of (FIG. 9A) iron oxide nanoparticles and (FIG. 9B) copper doped iron oxide nanoparticles results.

The reactivity test results are shown in FIG. 9. As shown in FIG. 9(a), the iron oxide nanoparticles begin to react with methane at 500° C., which is much lower than iron oxide microparticles. However, after adding copper dopant, the copper doped iron oxide nanoparticles begin to react with methane at 470° C. (FIG. 9(b)). In addition, when the TPR temperature reaches 900° C., copper doped iron oxide nanoparticles have 70% conversion, which is almost two times compared to iron oxide nanoparticles. The highest DTG value of copper doped iron oxide nanoparticles strike −10%/(O min), whereas, DTG value of iron oxide nanoparticles only have −2%/(O min) at the highest value. Therefore, TGA test indicates that copper dopant increases conversion rates and reactivity of iron oxide nanoparticles.

B. Syngas Generation Results

Figure 10:
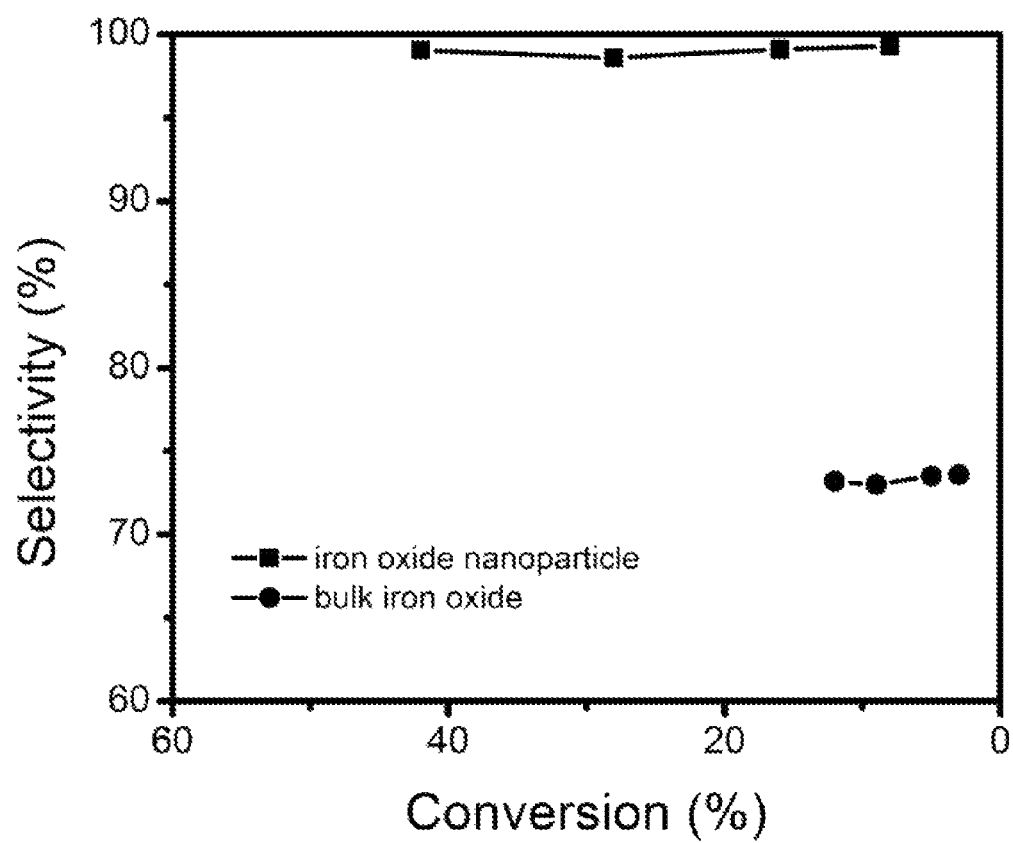
FIG. 10 shows results for an example syngas generation scheme in the simulated moving bed.

The performance of the iron oxide nanoparticles utilizing in syngas generation scheme was tested in a simulated moving bed in a U-tube reactor. 270 mg reduced sample was mounted on the bottom of a U-tube reactor and 100 mg iron oxide nanoparticles was amounted on the top. Different flow rates of methane (0.5, 1, 2, 5 mL/min) were dosed into the reactor. The outlet was connected with the mass spectra to analyze the gas component. The results of conversion of methane and selectivity of syngas are shown in FIG. 10. The selectivity of methane is nearly 99% for the four different methane flow rates. The curve for iron oxide microparticles is well below iron oxide nanoparticles, indicating iron oxide microparticles' lower selectivity and conversion rate compared with iron oxide nanoparticles.

The fixed bed experiment was performed in a quartz U-tube reactor with an inner diameter of 1 cm. For each sample, four weight hourly space velocity (WHSV) values of 17.8, 25, 30, 37.5 mL/($mg_{Fe2O3}$ h) were applied, which were realized by varying the solid loading while maintaining the inlet flow rate of $CH_4$ at 25 mL/min. In the experiment, the solids were amounted in the center of the reactor that is placed in a tube furnace and heated to 800° C. The outlet gas was analyzed with a mass spectrometry. The conversion of $CH_4$ and selectivity of syngas were calculated by the following equations:

$$\text{Conversion}(CH_4) = \frac{c_{CH_4,in} - c_{CH_4,out}}{c_{CH_4,in}}$$

$$\text{Selectivity} = \frac{c_{CO}}{c_{CO} + c_{CO_2}}$$

Figure 11A:
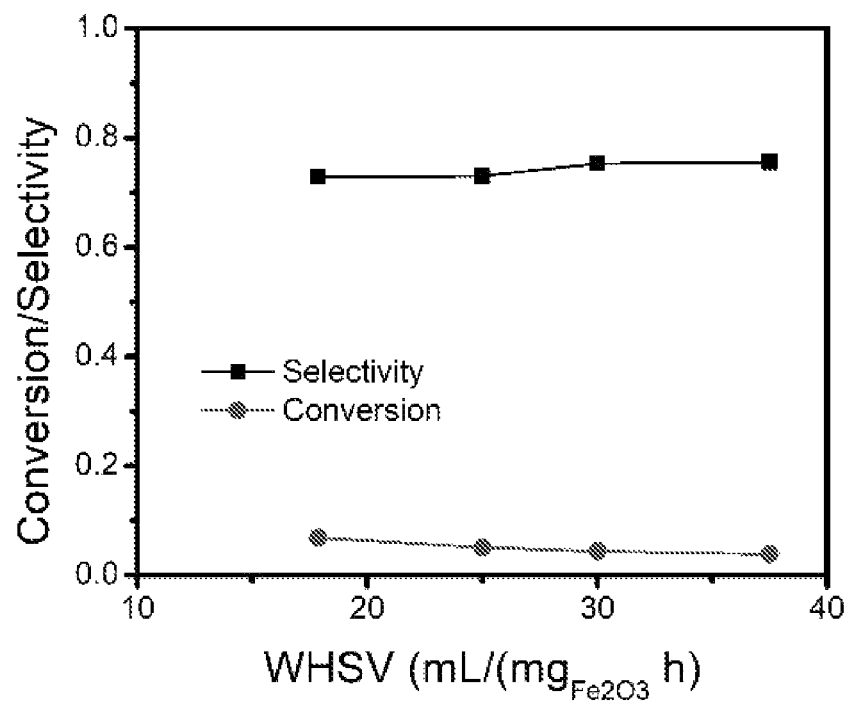
FIG. 11A and FIG. 11B show conversion of methane and selectivity of syngas under different WHSV. Fixed bed results for iron oxide microparticles (FIG. 11A) and iron oxide nanoparticles (FIG. 11B).
Figure 11B:
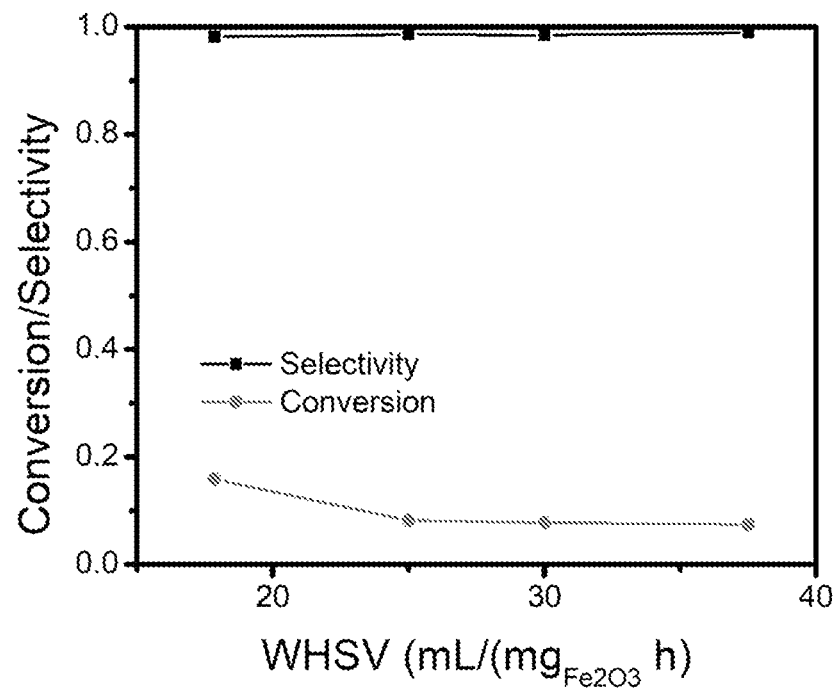

At tested WHSV values (17.8, 25, 30, 37.5 mL/($mg_{Fe2O3}$ h)), conversion of $CH_4$ for $Fe_2O_3$@SBA-15 is 131%, 60%, 76%, 92% higher than iron oxide microparticles. These values are shown in FIG. 11A and FIG. 11B.

C. Simulations Results

Figure 12:
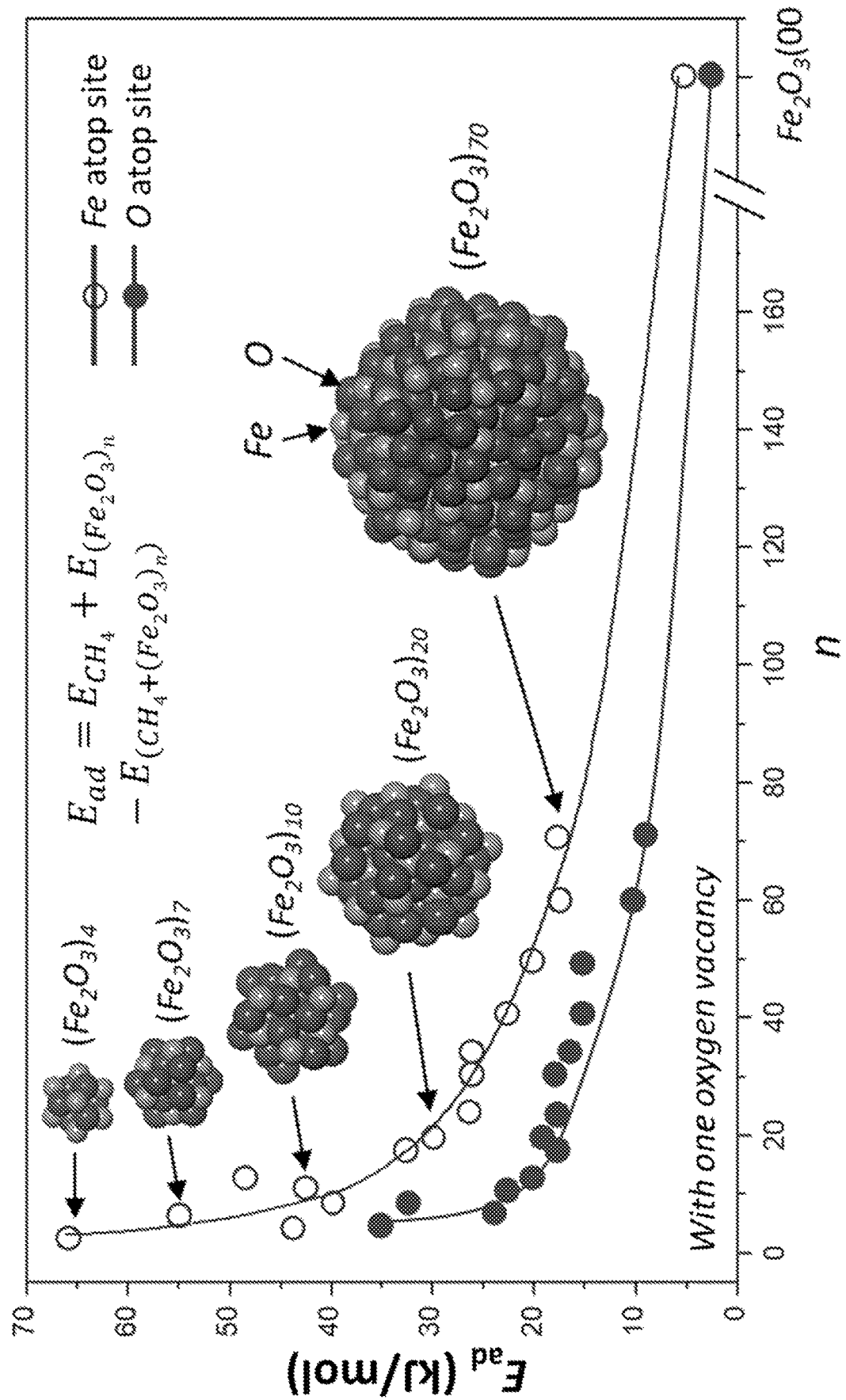
FIG. 12 shows calculated energies of $CH_4$ adsorption, $E_{ad}$ (open circles, kJ/mol), on Fe atop site and O atop site of $(Fe_2O_3)_n$ nanoparticles with one oxygen vacancy as a function of n. The adsorption trends are shown by the solid blue and red lines. The yellow circle denotes the oxygen vacancy.

To gain mechanistic insight into the role of the nanostructures in CO selectivity enhancement of iron oxide nanoparticles immobilized on SBA-15 mesoporous support and develop the nanoparticle screening strategy, the atomistic thermodynamics methods and density functional theory calculations are carried out to investigate the activity/structure relationship of nanoparticles. FIG. 12 shows calculated energies of $CH_4$ adsorption on Fe atop site and O atop site of $(Fe_2O_3)_n$ nanoparticles as a function of n. It can be seen that $CH_4$ adsorption energies dramatically decrease with increasing n when the sizes of $Fe_2O_3$ nanoparticles are at a relatively small scale. However, they decrease slowly with increasing n when the sizes are at relatively large scale. The strongest adsorption on $(Fe_2O_3)_4$ is $CH_4$ binding at the Fe atop site with an adsorption energy of 66.9 kJ/mol. The second stable configuration is $CH_4$ adsorption at the O atop site of $(Fe_2O_3)_4$ with an adsorption energy of 35.7 kJ/mol. When n increases from 4 to 70, the Fe atop adsorption becomes weaker with 46.3 kJ/mol lower adsorption energy. However, the adsorption at the Fe atop site and the O atop site of $(Fe_2O_3)_{70}$ nanoparticles is still stronger than adsorption on $Fe_2O_3$ (001) surface. This is because the average coordination number of surface Fe atoms in $(Fe_2O_3)_n$ nanoparticle is smaller than that on $Fe_2O_3$ (001) surface. The undercoordination results in an upward shift of the Fe d-band, yielding high binding energies.

Figure 13B:
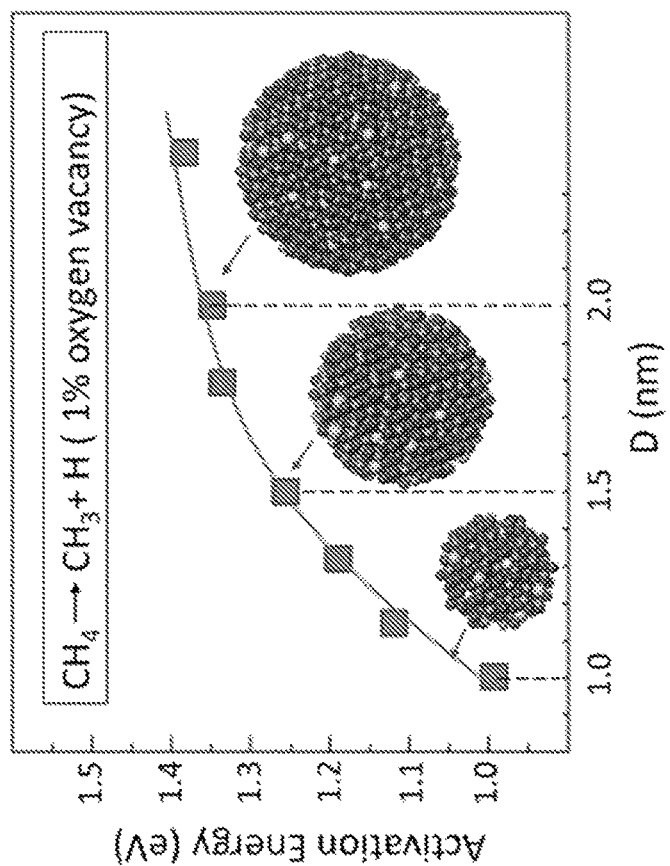
FIG. 13A and FIG. 13B show activation energies for $CH_4$ dissociation on $Fe_2O_3$ based nanoparticle of different sizes (FIG. 13A: initial state.
Figure 13A:
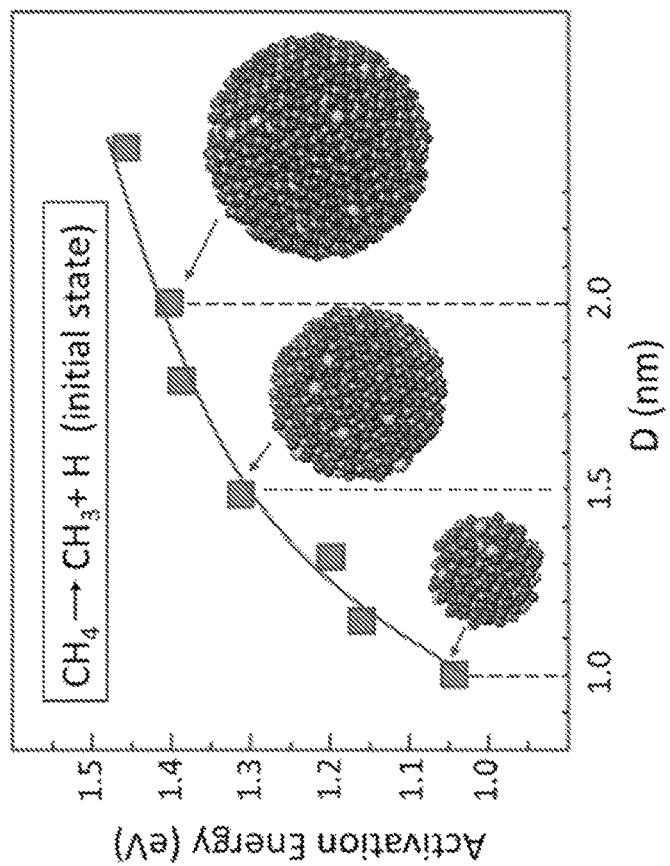

The energy barriers for methane dehydrogenation on 1 nm nanoparticle is ~0.35 eV lower than the corresponding barriers on the 2 nm nanoparticle (FIG. 13). Thus, methane partial oxidation with 1 nm NP is more favorable than that with 2 nm NP. It proves that the barrier of methane activation may depend on the size and morphology of nanoparticle.

After methane activation, C—H bonds are cleaved to generate a carbon atom and four hydrogen atoms. To determine the dominant pathway for converting the carbon atom to CO on $(Fe_2O_3)_n$, a relatively small nanoparticle (n<70) was chosen as the models to calculate the reaction barriers. $(Fe_2O_3)_n$ has three chemically distinguishable types of lattice oxygen atoms: 2-fold coordinated lattice oxygen $O_{2C}$, 3-fold coordinated lattice oxygen $O_{3C}$, and 4-fold coordinated lattice oxygen $O_{sub}$. As such, there are three reaction pathways for CO formation.

Figure 14:
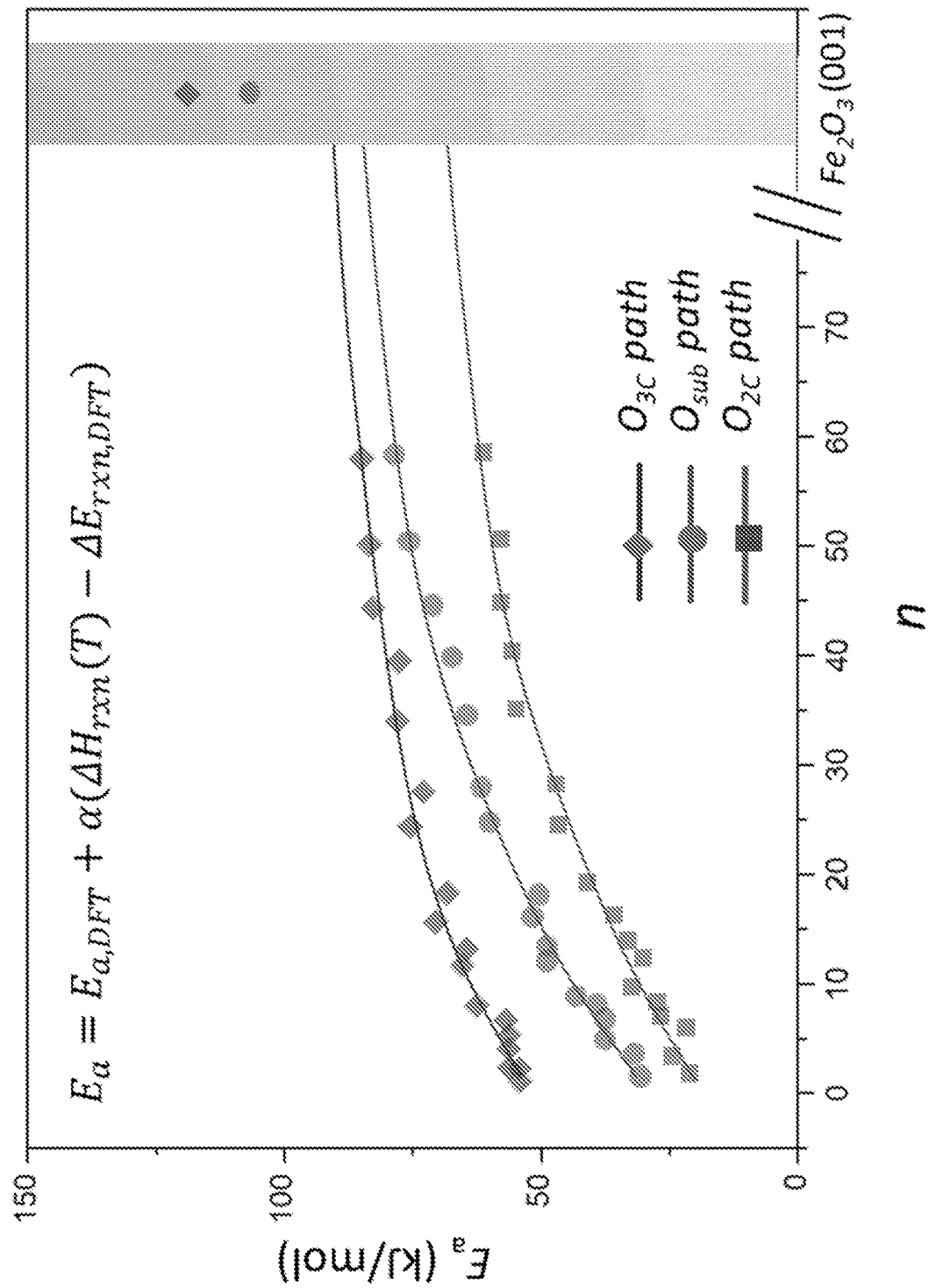
FIG. 14 shows calculated energy barrier of CO formation, $E_a$ (kJ/mol) on $(Fe_2O_3)_n$ nanoparticles as a function of n. $\Delta H_{rxn}(T)$ is the reaction enthalpy at finite temperature, which is calculated from the individual enthalpies of the initial state and the final state for the constituent elementary reactions. $\Delta E_{rxn,DFT}$ is the difference between the energies of final state and initial state at 0 K. The variable a denotes the relative position of the transition state compared to the initial (i.e., $\alpha=0$) or final (i.e., $\alpha=1$) state of the relevant elementary reaction.

The calculated CO formation barriers are shown in FIG. 14. The plots indicate C binding to $O_{2C}$ is the most favorable path, compared to C binding to $O_{3C}$ and $O_{sub}$ because Fe—O bonds of low-coordinated lattice oxygen atoms are easier to break than high-coordinated lattice oxygen atoms. The formed CO may further react with surface lattice O atoms to form $CO_2$. For example, the formation of $CO_2$ on $Fe_{40}O_{60}$ nanoparticle needs to overcome a barrier of 148.9 kJ/mol, which is 30.4 kJ/mol higher than that of $CO_2$ formation on $Fe_2O_3$ (001) surface. The high barrier with respect to $CO_2$ formation on $Fe_{40}O_{60}$ is attributed to the surface stress of nanoparticles, induced by surface atoms with unsaturated coordination. The surface stress leads to shorter and thus stronger Fe—$O_{3c}$ bonds compared to Fe—$O_{3c}$ bonds of the $Fe_2O_3$ (001) surface. The formation of $CO_2$ on $Fe_{40}O_{60}$ is endothermic, with the calculated reaction energy of 58.2 kJ/mol. These results indicate that the $CO_2$ formation on $Fe_{40}O_{60}$ is both kinetically and thermochemically unfavorable. Therefore, iron oxide nanoparticles promote CO formation while inhibiting $CO_2$ production.

$CO_2$ is a gaseous oxidizing agent which can be converted to CO via reacting with reduced oxygen carriers. It is widely believed that the first step in $CO_2$ reduction is the activation of the C=O bond and charge transfer for the eventual formation of CO. Because $CO_2$ is thermodynamically stable, the activation is difficult on the surface of conventional oxygen carrier microparticles. However, the simulations show reduced metal oxide-based nanoparticles can lower the $CO_2$ activation barrier. In particular, reduced ferrite nanoparticles (rFNP) exhibit high activity for $CO_2$ activation. Ferrites are metal oxides with spinel structure of general formula $AB_2O_4$, where A and B are metallic cations positioned at two different crystallographic sites: tetrahedral (A site) and octahedral (B site). The cations of both positions are tetrahedrally and octahedrally coordinated to lattice oxygen atoms.

Figure 15:
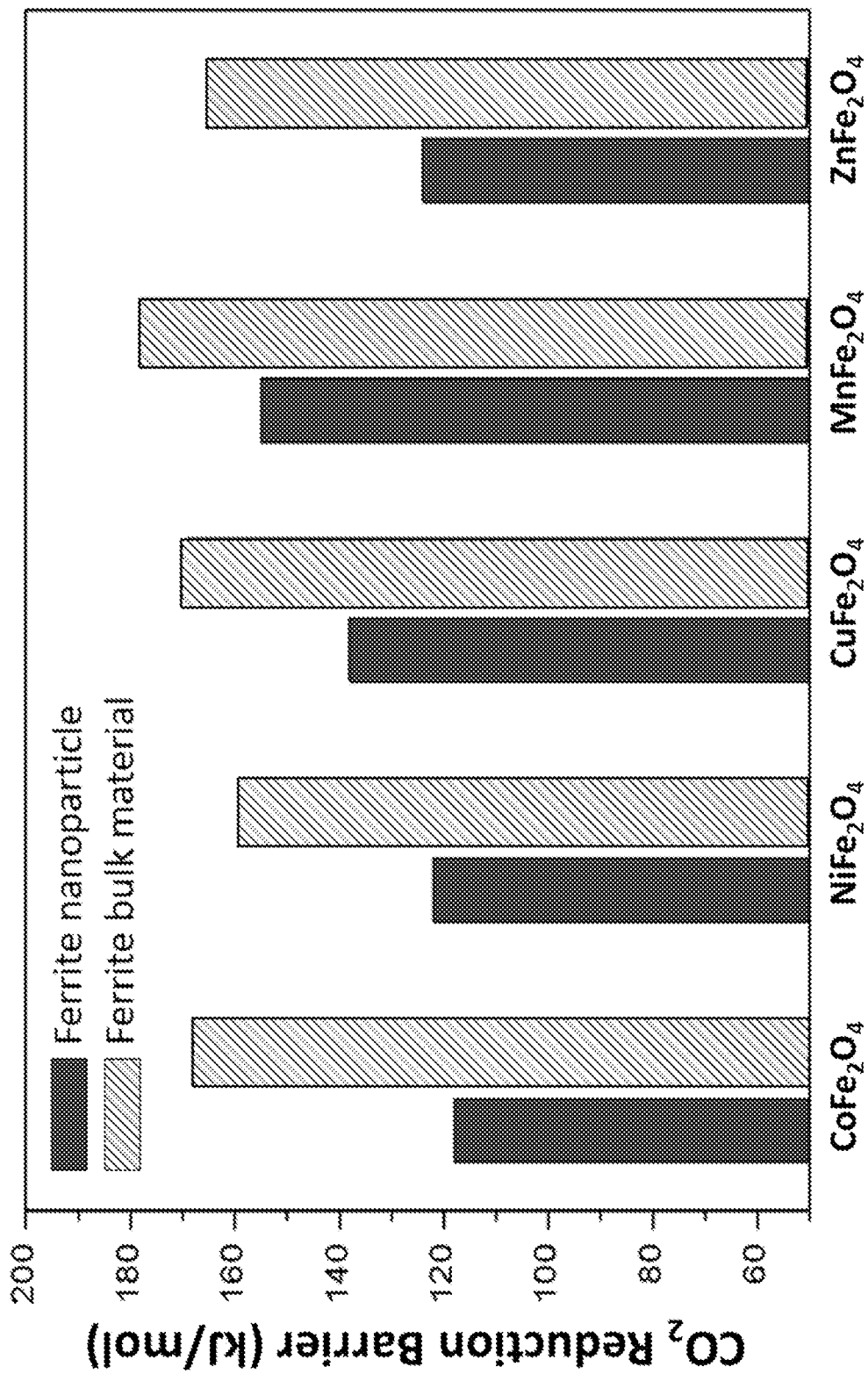
FIG. 15 shows calculated $CO_2$ reduction barriers for ferrite nanoparticles (1 nm) and ferrite microparticle materials.

The common examples for ferrites are $NiFe_2O_4$ (where M=Co, Ni, Cu, Mn and Zn) as well as $ABO_3$ perovskite materials, such as $LaFeO_3$. The calculated $CO_2$ reduction barriers for these ferrites nanoparticles (1 nm in diameter) and microparticles (bulk material) are shown in FIG. 15. It highlights the difference in reactivities of ferrites nanoparticles and microparticles, indicating the nanostructure of ferrite especially $NiFe_2O_4$, $CoFe_2O_4$ and $ZnFe_2O_4$, can significantly facilitate $CO_2$ activation and conversion.

D. Experimental Doped $Fe_2O_3$@SBA-15 in Dry Reforming of Methane

Doped $Fe_2O_3$@SBA-15 samples were all tested in a fixed bed reactor (FIG. 2B). Each sample was composed of 200 mg reduced 5at % metal-doped $Fe_2O_3$@SBA-15 at the bottom of the reactor, and less than 10 mg of unreduced 5% metal-doped $Fe_2O_3$@SBA-15 on top of the reduced sample. The reactor was heated from room temperature to 800° C. with a 40° C./min temperature ramp rate. Then the reactor was kept at 800° C. for 1 hour to stabilize the temperature before reaction started. Afterwards, the mixture of 0.5 mL/min $CH_4$ and 0.6 mL/min $CO_2$ was injected to the reactor and reacted with the sample. $CO_2$ flow rate is set to be 20% higher than $CH_4$ flow rate in order to suppress the carbon deposition during the reaction. The steady products were analyzed by a mass spectrometer (MS).

The dry reforming of methane can be represented by:

$$CO_2 + CH_4 \rightarrow 2H_2 + 2CO$$

1. Results of 5 at % Ni-Doped $Fe_2O_3$@SBA-15

Figure 16:
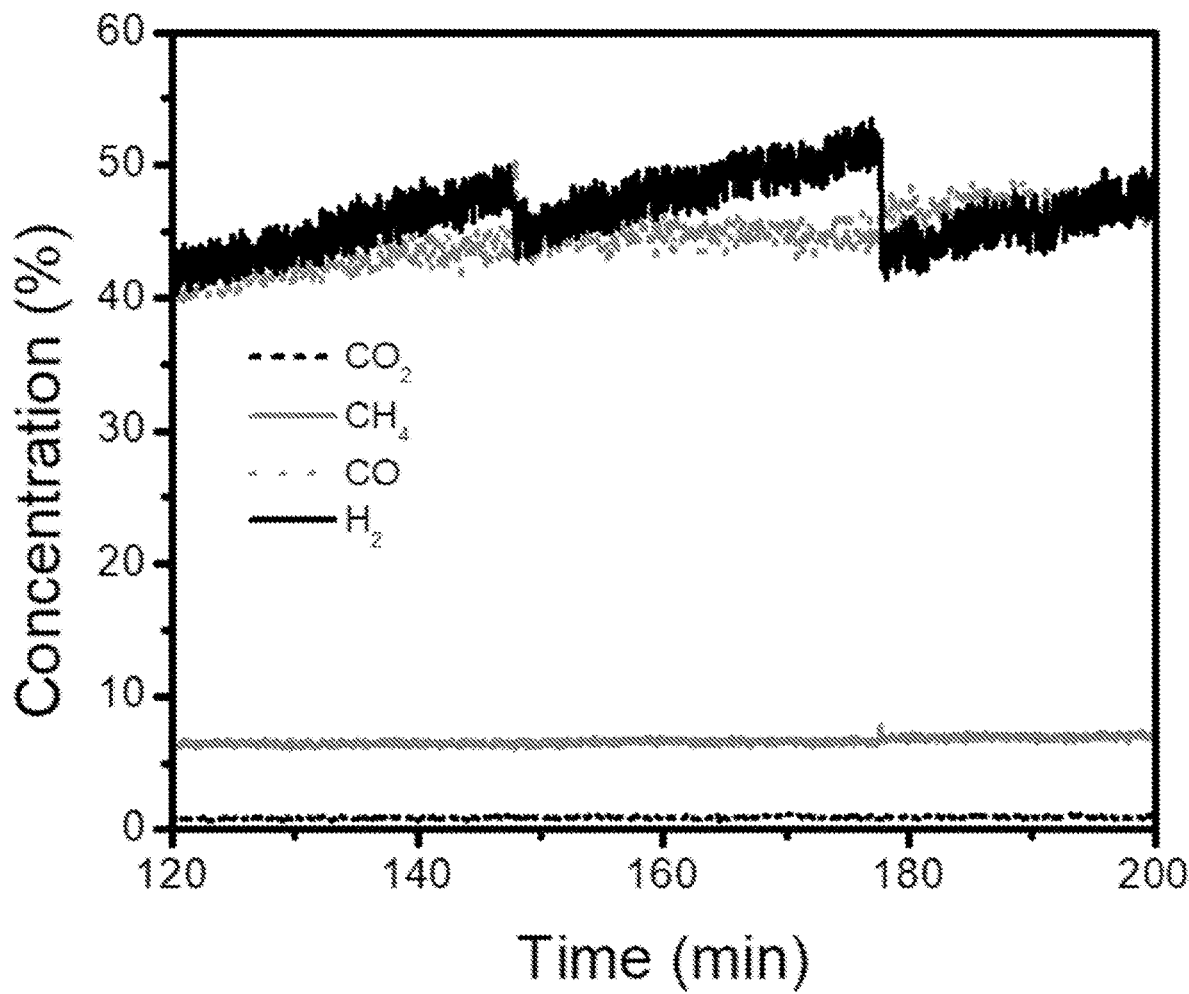
FIG. 16 shows experimental results of the 5 atomic percent (at %) Ni-doped $Fe_2O_3$@SBA-15 sample in fixed bed as demonstrated in FIG. 2B.

As shown in FIG. 16, the outlet gas contains less than 0.75% of $CO_2$, and 6% of $CH_4$, indicating a high $CO_2$ conversion of over 98% and a $CH_4$ conversion of 80%. This result shows that the 5 at % Ni-doped $Fe_2O_3$@SBA-15 is highly efficient in $CO_2$ conversion and utilization, it also promotes high yield of pure syngas generation. The $H_2$ to CO ratio is close to 1, higher than 0.8 which is the converting ratio of $CH_4$:$CO_2$. This implies carbon deposition during the reaction. Nevertheless, no tendency of activity loss was observed during the 2-hour operating time, proving the high stability of the sample at temperatures as high as 800° C.

2. Results of 5 at % Co-doped $Fe_2O_3$@SBA-15

Figure 17:
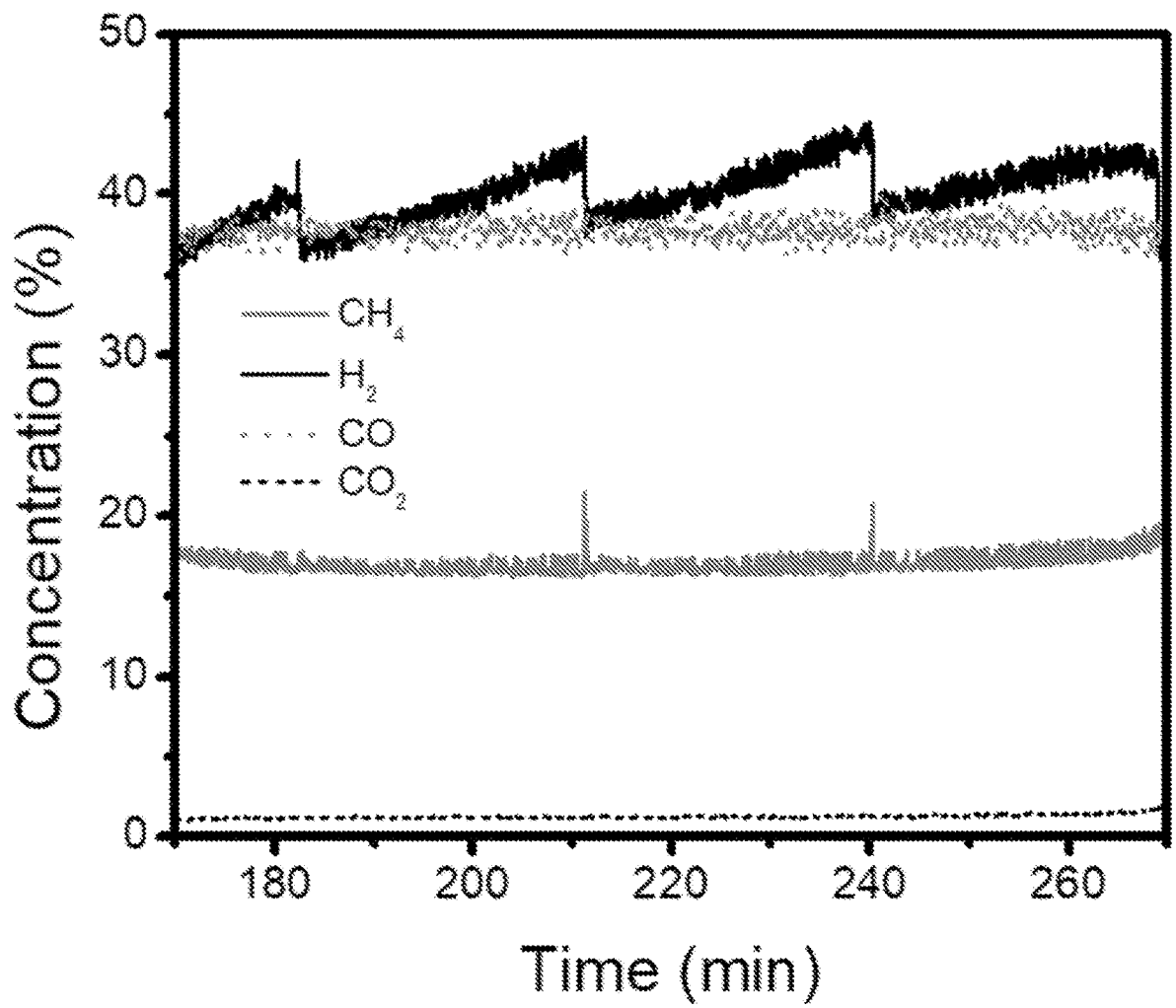
FIG. 17 shows experimental results of the 5 at % Co-doped $Fe_2O_3$@SBA-15 sample in fixed bed as demonstrated in FIG. 2B.

A similar test was conducted on 5 at % Co-doped $Fe_2O_3$@SBA-15. FIG. 17 shows the performance of 5 at % Co-doped sample in the same reactor configuration. For 5 at % Co-doped $Fe_2O_3$@SBA-15 sample, the $CO_2$ conversion is 97% and $CH_4$ conversion is 55%. This sample also shows a high stability, no loss of activity is observed during the test at 800° C. despite the carbon deposition. The conversion of both $CH_4$ and $CO_2$ are lower than 5 at % Ni-doped $Fe_2O_3$@SBA-15 sample, this is consistent with literature prediction that Ni has higher activity in dry forming compared with Co.

E. Results of $Fe_2O_3$@SBA-16

Mesoporous support SBA-16, which has a 3-D interconnected mesopore structure, was tested as a support for iron oxide nanoparticles. $Fe(NO_3)_3 \cdot xH_2O$ was first dissolved in ethanol. Mesoporous support SBA-16 was then added in the solution and the whole was subject to ultrasonic treatment for 1 hour. The suspension was mixed under vigorous stirring overnight. The solid precursor was collected and dried in air. The as-prepared precursor was calcined at 500-700° C. to obtain the final product $Fe_2O_3$@SBA-16.

TEM images were obtained on an FEI Tecnai G2 30 with working voltage at 200 kV. High resolution TEM operation was performed on an FEI Image Corrected Titan3 G2 60-300 S/TEM with working voltage at 300 kV.

The temperature programmed reaction with methane was conducted in a SETARAM thermogravimetric analysis (TGA) device. In each test 20 mg sample was heated from 370° C. to 430° C. and 650° C.-850° C. with a heating ramp rate of 20° C./min. The reducing gas is composed of 20 mL/min of $CH_4$ balanced with 180 mL/min of He. Mass spectrometry (MS) was used to analyze the outlet gas composition.

The reaction rate and stability of the samples were tested in TGA with 100 reduction-oxidation (redox) cycles at 800° C. In a reduction step, each sample reacted with 40 mL/min of $CH_4$ balanced with 100 mL/min of $N_2$ and 50 mL/min of He carrier gas for 5 minutes. In a regeneration step, each sample was oxidized by 100 mL/min of air balanced with 100 mL/min of $N_2$ for 5 minutes. A buffering step between reduction and regeneration was also performed with 100 mL/min of $N_2$ as the flushing gas to prevent the mixing of air and methane. The conversion rate of the oxygen carrier is calculated by:

$$\text{Conversion rate} = \frac{\Delta m}{m_{Fe_2O_3} \times 30\%}$$

where $\Delta m$ is the weight change during oxidation, $m_{Fe_2O_3}$ is the weight of $Fe_2O_3$ in the total sample, and 30% is the weight percentage of oxygen in $Fe_2O_3$.

For better comparison, gas concentrations and dTG value are divided by the total mass of available oxygen in the sample, thus the unit of the gas concentration is "%/go". The equation is shown below:

$$\text{Concentration} = \frac{x_i}{m_{Fe_2O_3} \times 30\%}$$

where $x_i$ stands for gas mole fraction, $m_{Fe_2O_3}$ is the weight of $Fe_2O_3$ in the total sample, and 30% is the weight percentage of oxygen in $Fe_2O_3$.

The selectivity is calculated by:

$$\text{Selectivity} = \frac{c_{CO}}{c_{CO} + c_{CO_2}} \times 100\%$$

where $c_{CO}$ is the mole fraction of CO product, $c_{CO_2}$ is the mole fraction of $CO_2$ product.

Figures 18A, 18B:
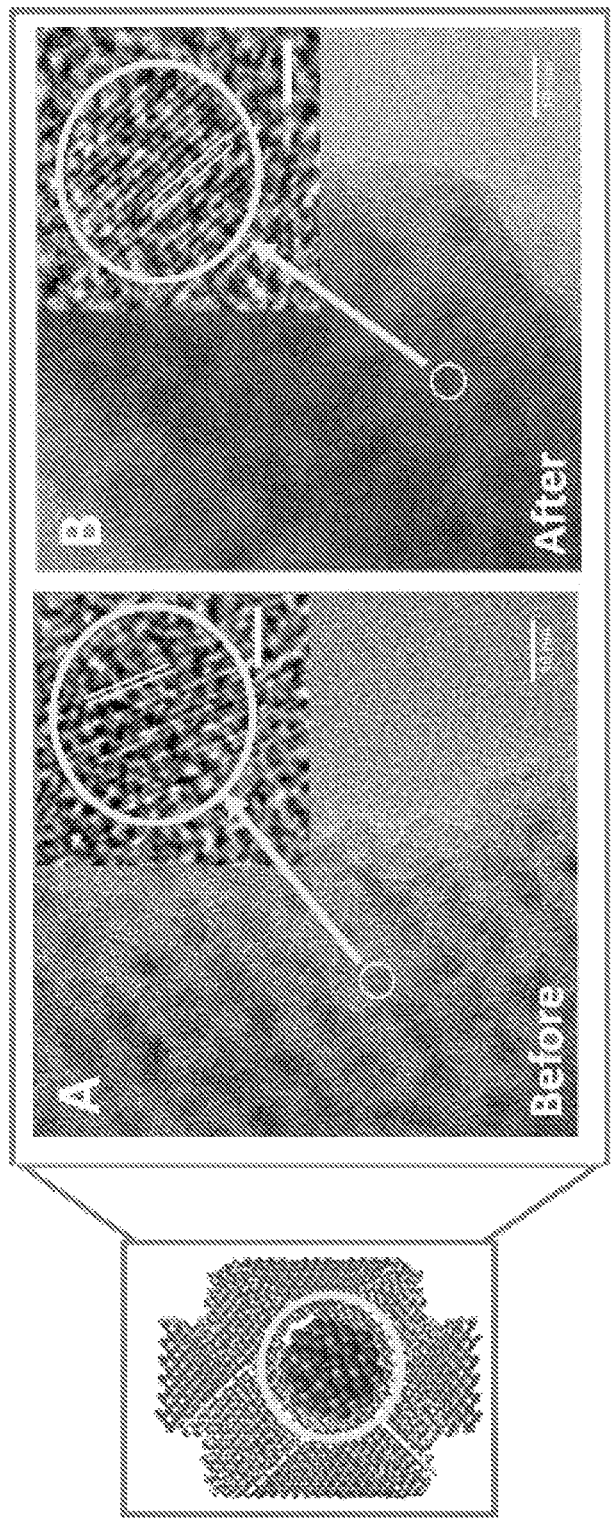
FIG. 18A is a TEM image of fresh $Fe_2O_3$@SBA-16.
FIG. 18B is a TEM image of $Fe_2O_3$@SBA-16 after 100 redox cycles. (inset scale 1 nm).

FIG. 18A-FIG. 18D shows the TEM and TPR result for $Fe_2O_3$@SBA-16. The structural features of freshly synthesized $Fe_2O_3$@SBA-16 is presented in FIG. 18A. With $Fe_2O_3$ nanoparticle of 3-6 nm dispersed in a highly ordered 3-D cubic structure. The $Fe_2O_3$ nanoparticles are single crystalline (FIG. 18A inset) with sphere-like structures. No agglomeration of nanoparticles was observed on the surface of $Fe_2O_3$@SBA-16, suggesting that all the nanoparticles are embedded in the mesopores following the mesoporous support profile. The particle size remains unchanged with no sign of sintering after 100 redox cycles as shown in FIG. 18B, confirming the high stability of $Fe_2O_3$@SBA-16.

Figure 18D:
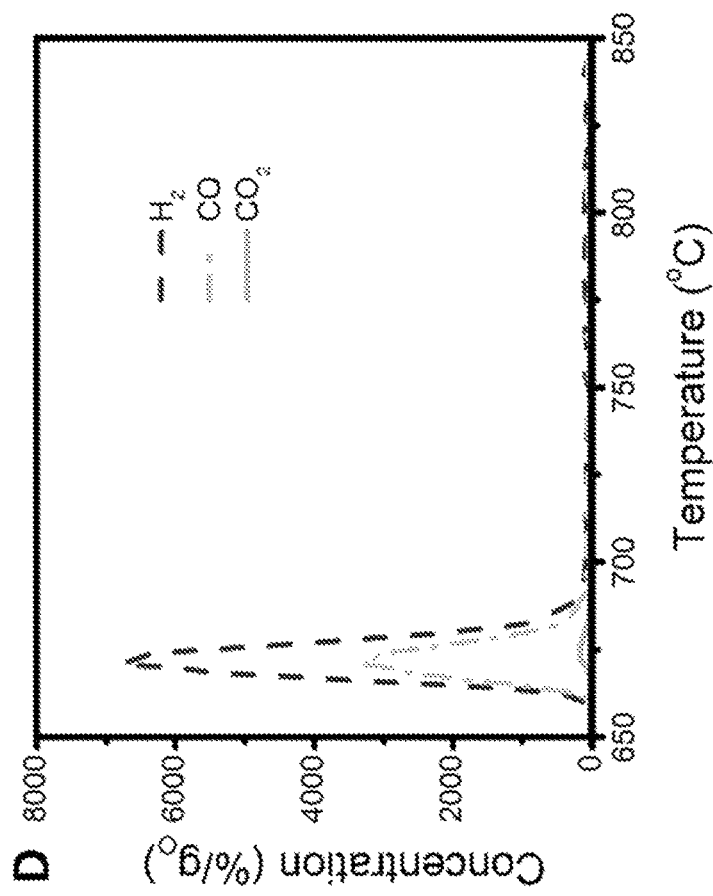
FIG. 18D shows TPR results of $Fe_2O_3$@SBA-16 at 650-850° C.
Figure 18C:
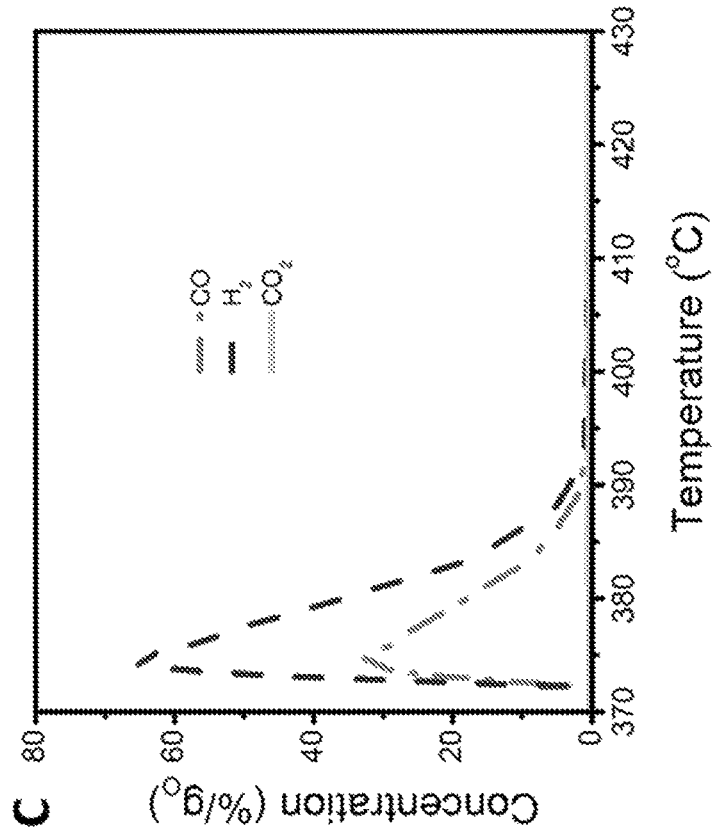
FIG. 18C shows TPR results of $Fe_2O_3$@SBA-16 at 370-430° C.

The temperature programmed reduction (TPR) study with methane was carried out on $Fe_2O_3$@SBA-16 with an oxygen carrying capacity of 5.4%, and the results are shown in FIG. 18C and FIG. 18D. Minimal surface agglomeration was observed. Both lower temperature (370-430° C.) and higher temperatures (650-850° C.) were applied to test the reactivity of $Fe_2O_3$@SBA-16 in broad temperature windows (FIG. 18C and FIG. 18D). The onset reaction temperature was as low as around 400° C. in $Fe_2O_3$@SBA-16. Increased reactivity was observed at higher temperatures due to the higher kinetic energy of molecules. The overall selectivity to syngas for $Fe_2O_3$@SBA-16 is higher than 95%. A ratio of $H_2$:CO at 2:1 indicates no carbon deposition during TPR test.

Figure 19:
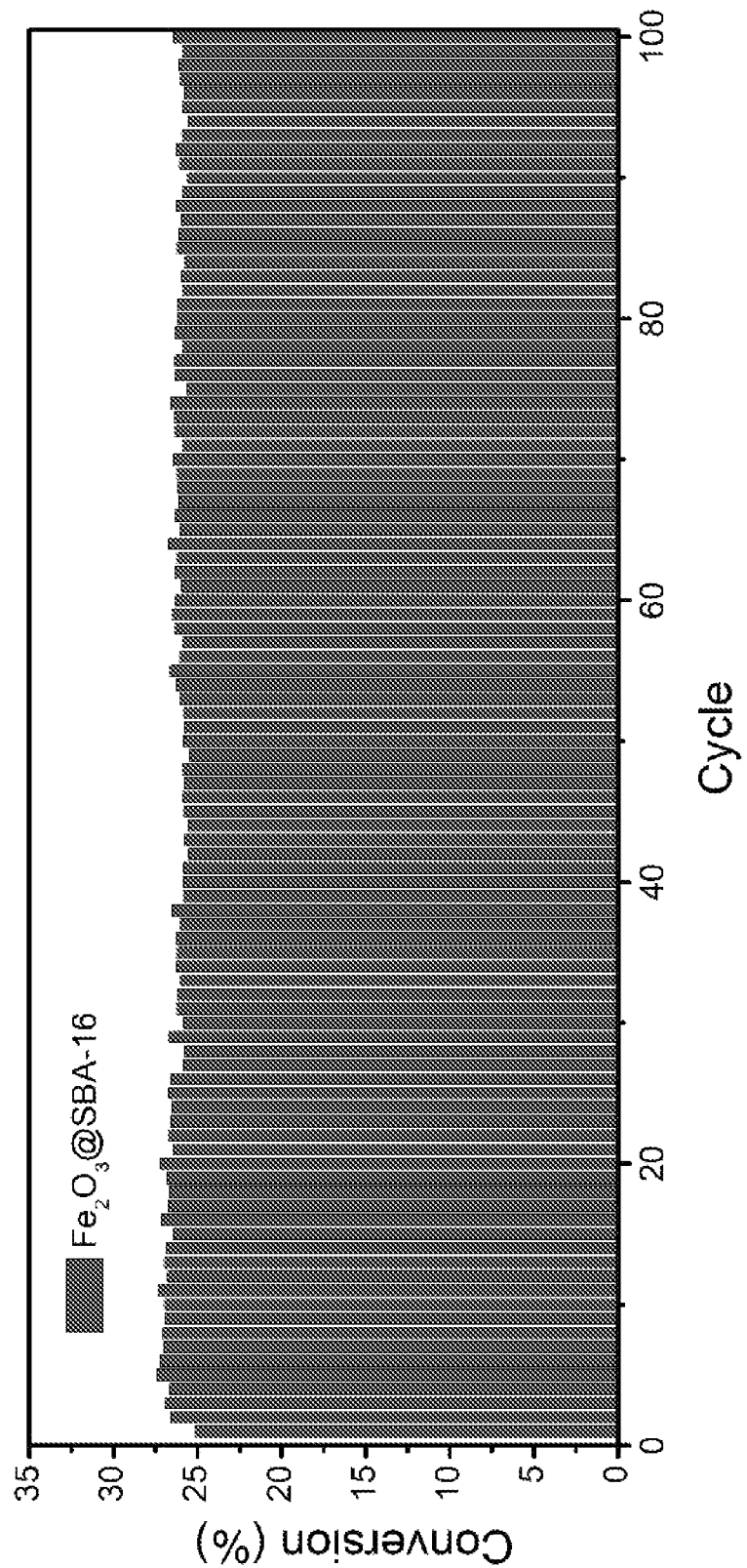
FIG. 19 shows redox cycle results of $Fe_2O_3$@SBA-16.

FIG. 19 shows the conversion rates of $Fe_2O_3$@SBA-16 during the 100 redox cycles. Minimal fluctuation in conversion rates during 100 continuous cycles indicates high chemical and physical stability in $Fe_2O_3$@SBA-16. The average conversion rate for the sample was 26%, which is 660% higher than iron oxide microparticles (bulk $Fe_2O_3$) reported in literature.

F. Result of Dynamic Monte Carlo (DMC) Simulation

Dynamic Monte Carlo (DMC) simulations were used to model the methane diffusion in $Fe_2O_3$@SBA-15 and $Fe_2O_3$@SBA-16. Periodic boundary conditions were applied in all three directions, the methane-methane collisions were neglected, and methane molecules were represented by material points with velocities. The simulations can be summarized as the following few steps.

(1) At the starting point of simulations, randomly generated methane molecules were placed inside the porous volume and were given randomly selected velocity directions. (2) The methane molecules moved forward until colliding with the wall of porous network, either with the surface of the placed-in nanoparticles or with the surface of SBA-15 or SBA-16. (3) After collision, methane molecules were bounce back, and new directions were randomly selected according to the cosine law. (4) Return to step (2).

After sufficient collisions, the self-diffusivity was estimated by Einstein's equation:

$$D = \lim_{r \to \infty} \frac{1}{\alpha t} |\vec{l}(t) - \vec{l}(0)|^2 = \lim_{r \to \infty} \frac{v_{ave}}{\alpha L} |\vec{l}(t) - \vec{l}(0)|^2.$$

where $\alpha=6$ for 3-D simulations, L is the total trajectory length of the methane molecules and $v_{ave}$ is the average gas velocity of methane by $$v_{ave} = \sqrt{\frac{8RT}{\pi M}},$$

and M is the mass per mole of methane.

If the diffusion process is highly heterogenous, e.g., in the nanochannels of SBA-15, component-wise diffusivity can be expressed as:

$$D_i = \lim_{r \to \infty} \frac{1}{\alpha t} |l(t) - l(0)|^2 = \lim_{r \to \infty} \frac{v_{ave}}{\alpha L} |l(t) - l(0)|^2,$$

where i=x, y or z.

The nanoparticles were randomly placed in the mesopores of the porous network without overlapping with each other. A large enough computational domain was considered to eliminate the fluctuations due to the randomness of nanoparticle positions. For the SBA-15, 2 periodic nanochannels, each with length of 10,240,000 nm and diameter of 8 nm were considered. For the SBA-16, a periodic domain of 1024 nm×1024 nm×1024 nm was considered with meso- and micro-pore diameters being 6 nm and 4 nm, respectively.

Figure 20:
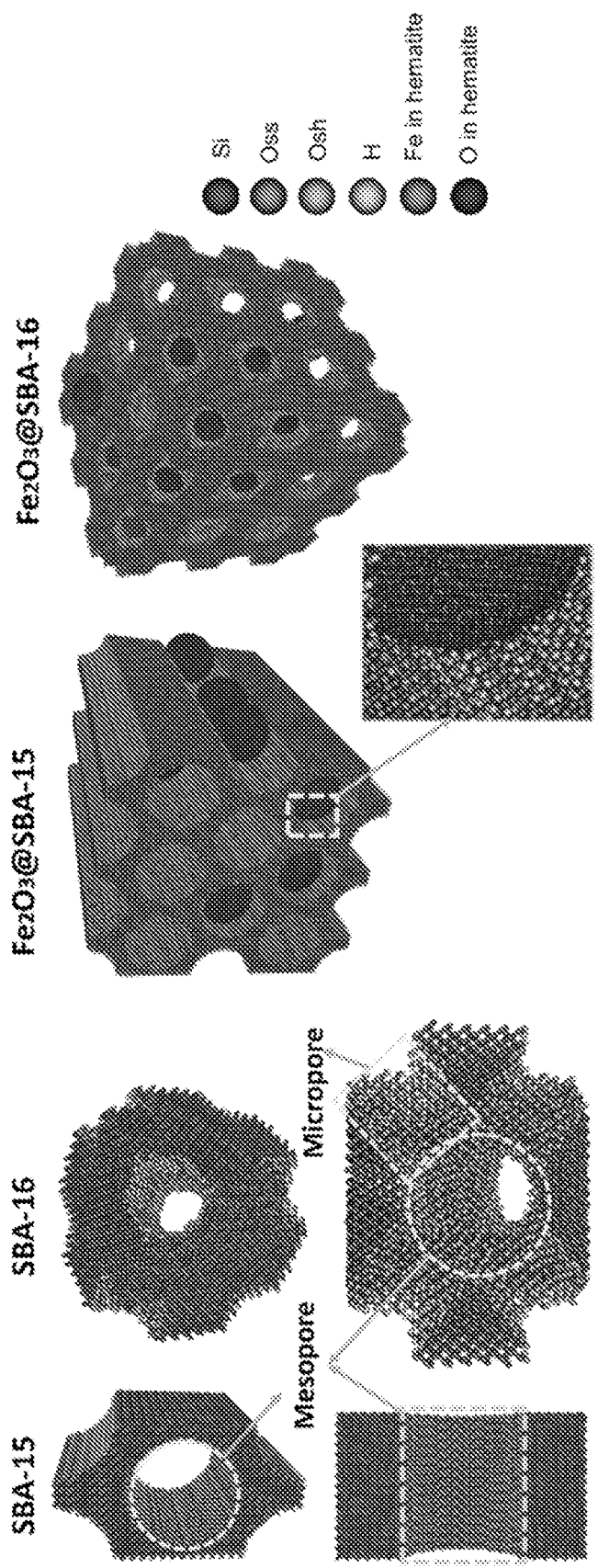
FIG. 20 shows unit cells and porous networks for SBA-15 and SBA-16. From left to right: unit cell for SBA-15, unit cell for SBA-16, porous network for SBA-15, and SBA-16. Oss denotes oxygen atom connecting with two silicon atoms, Osh denotes oxygen atom in surface —OH.

The model configurations of SBA-15 and SBA-16 frameworks are shown in FIG. 20, where the geometrical parameters are consistent with experimental results. Because the pore diameters are much smaller than the mean free path of the methane molecules, Knudsen diffusion of methane is considered as the dominating transport mechanism in both SBA-15 and SBA-16. This is confirmed by the GCMC simulations in the range of temperature from 600° C. to 800° C., where the calculated low methane loadings in SBA-15 (7-9 $CH_4$ molecules/unit cell) and SBA-16 (4-5 $CH_4$ molecules/unit cell) indicate that $CH_4$-surface collisions is much more frequent than the intermolecular collisions.

DMC simulations discover varying morphological effects of the $Fe_2O_3$ nanoparticles supported by different mesoporous network on the $CH_4$ diffusivity ($D_{CH_4}$). FIG. 21 features the mesoporous networks of $Fe_2O_3$@SBA-15 and $Fe_2O_3$@SBA-16 adopted in the DMC simulations, and FIG. 21 illustrates the influence of nanoparticle size and loading on $D_{CH_4}$. As shown in FIG. 22A, DMC simulations reveal the dependence of $D_{CH_4}$ on nanoparticle size is distinct between $Fe_2O_3$@SBA-15 and $Fe_2O_3$@SBA-16. $D_{CH_4}$ of $Fe_2O_3$@SBA-15 ($D_{CH_4,Fe_2O_3@SBA-15}$) decreases significantly with increasing nanoparticle sizes, whereas $D_{CH_4}$ of $Fe_2O_3$@SBA-16 ($D_{CH_4,Fe_2O_3@SBA-16}$) is nearly independent of nanoparticle size. A relative diameter between nanoparticles and mesopore ($d_r^{critical}$) is established to determine $D_{CH_4,Fe_2O_3@SBA-15}$ and $D_{CH_4,Fe_2O_3@SBA-16}$ under different particle loadings. $D_{CH_4,Fe_2O_3@SBA-16}$ is higher than $D_{CH_4,Fe_2O_3@SBA-15}$ in the region above $d_r^{critical}$ whereas $D_{CH_4,Fe_2O_3@SBA-16}$ is lower than $D_{CH_4,Fe_2O_3@SBA-15}$ in the region below $d_r^{critical}$ The $d_r^{critical}$ is between 0.93 and 0.95 in this simulation when the nanoparticle loading is 0.10 and 0.04, respectively, indicating a high $d_r$ facilitates methane diffusion in $Fe_2O_3$@SBA-16.

Here we discover two distinct factors that appear to impact methane diffusivity. A congestion effect is defined as the phenomena that confines methane molecule diffusion in the space between $Fe_2O_3$ nanoparticles and internal surface of silica wall. A trapping effect is defined as the phenomena that methane molecules are caged in the space created by neighbouring $Fe_2O_3$ nanoparticles. Both effects are illustrated as in FIG. 22.

Figures 21A, 21B:
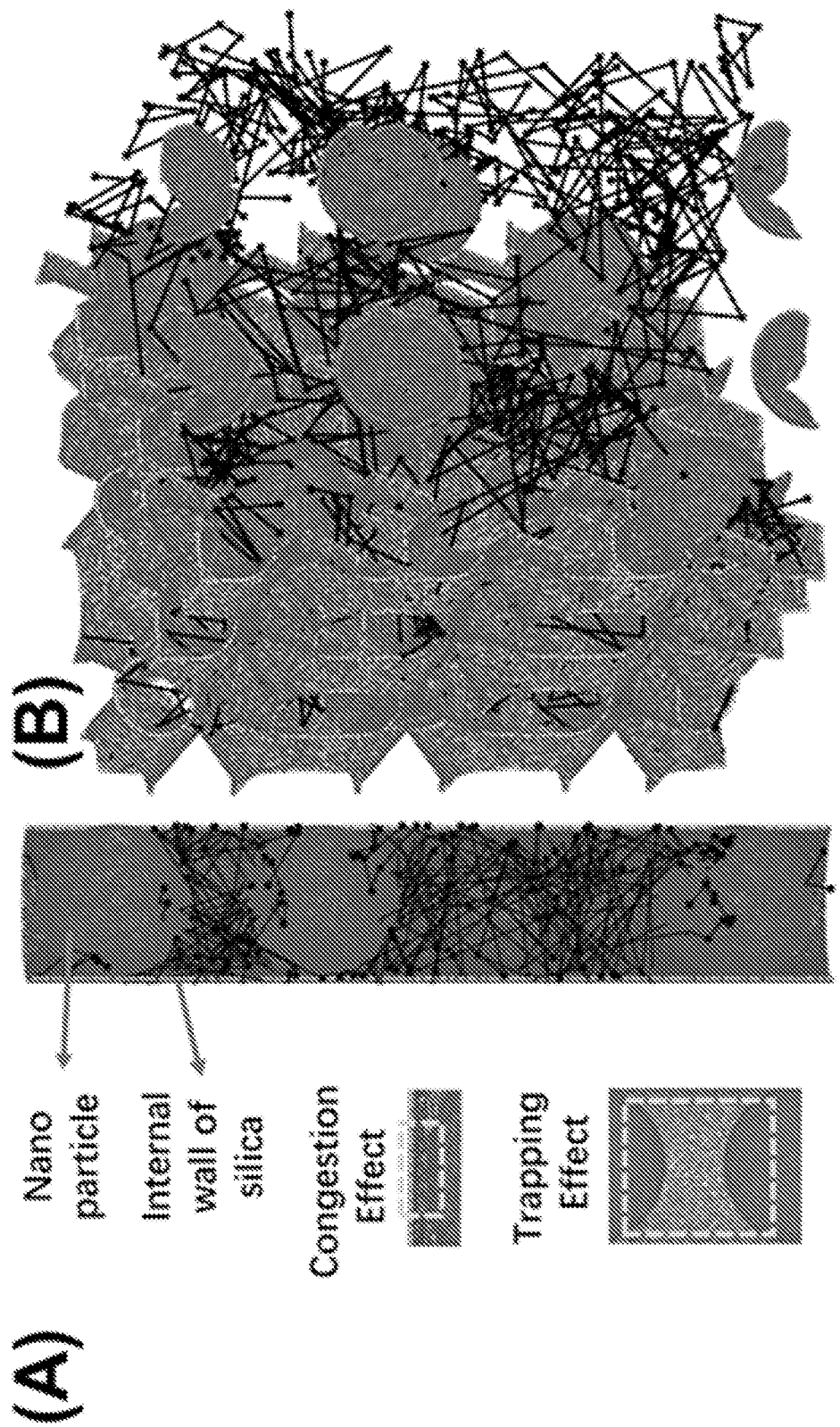
FIG. 21A and FIG. 21B show illustrations of trajectories of methane in DMC simulations for $Fe_2O_3$@SBA-15 and $Fe_2O_3$@SBA-16, respectively.

The different sensitivity of $D_{CH_4}$ with respect to nanoparticle size between $Fe_2O_3$@SBA-15 and $Fe_2O_3$@SBA-16 can be attributed to their distinct flow patterns, which are dictated by the morphology of the mesoporous networks shown in FIG. 20 and FIG. 21. For $Fe_2O_3$@SBA-15, the mesopores are constructed by 2-D cylindrical channels; as a result, methane molecules would be trapped in the spaces between neighbouring nanoparticles by the narrow spaces between the nanoparticle and the silica wall when the nanoparticle size becomes considerable as shown in FIG. 21A.

On the other hand, mesopores in $Fe_2O_3$@SBA-16 adopts a fully connected 3-D body centered cubic structure, which substantially mitigates the trapping effect with minimal congestion effect by allowing the molecules to bypass through the micropores that surrounds the mesopore cavity, as shown in FIG. 21B. Therefore $D_{CH_4,Fe_2O_3@SBA-15}$ is found much higher than $D_{CH_4,Fe_2O_3@SBA-15}$ when the relative diameter is above $d_r^{critical}$ as presented in FIG. 22A.

Figure 22B:
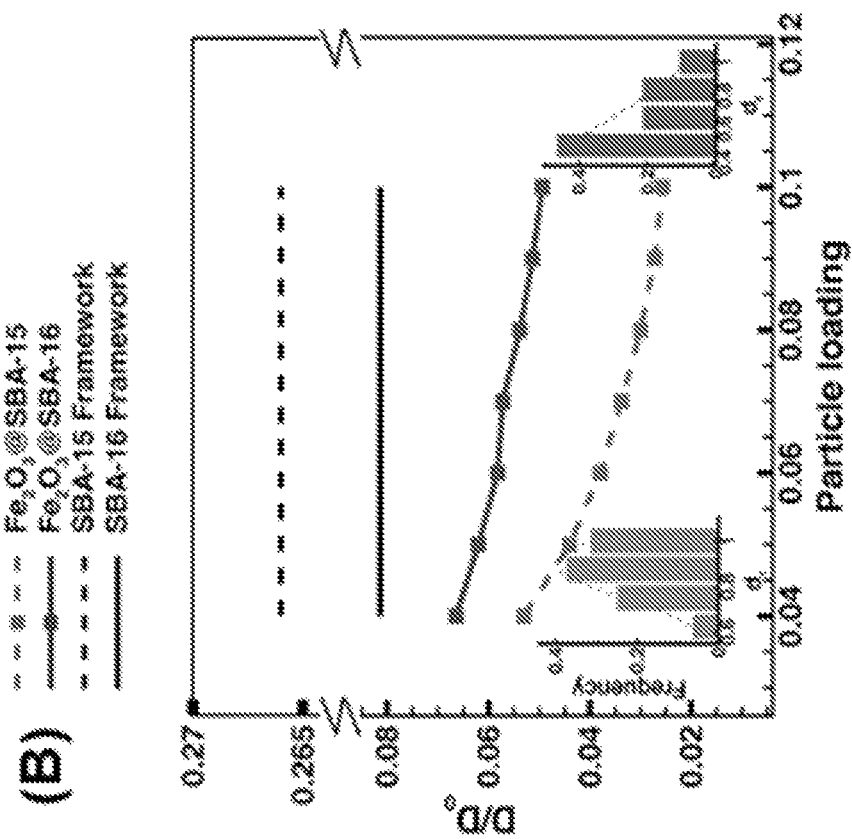
FIG. 22A and FIG. 22B show diffusivity values for $Fe_2O_3$@SBA-15 and $Fe_2O_3$@SBA-16. $D_0 = v_{ave} l_{unitcell}$, where $v_{ave}$ is the average gas velocity and $$l_{unitcell} = 10.24 \text{ nm}, d_r = \frac{d_{nanoparticle}}{d_{mesopore}}.$$
Figure 22A:
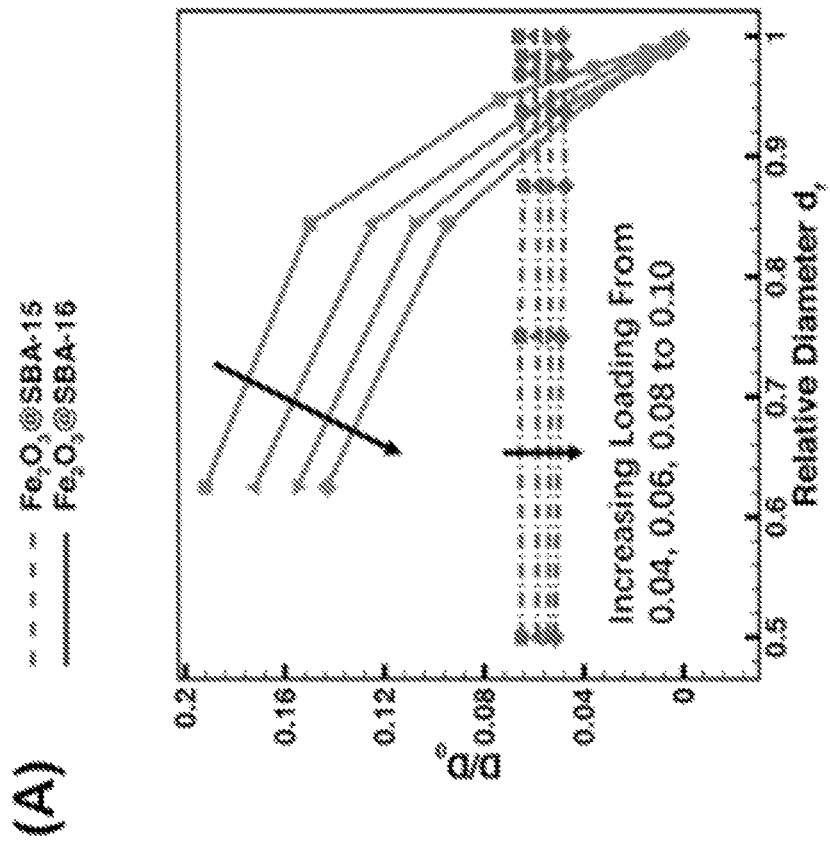

FIG. 22B further considers the cases where the size of dispersed nanoparticles follows the cut-off normal distribution, which matches the experimental observations from TEM and redox performance in the current study. It is also worth pointing out that $D_{CH_4,Fe_2O_3@SBA-15}$ is higher than $D_{CH_4,Fe_2O_3@SBA-16}$ when the relative diameter is below $d_r^{critical}$ as indicated in FIG. 22A. This can be explained by the fact that $CH_4$ diffuses faster in the framework of SBA-15 than SBA-16 without the presence of nanoparticles as shown in FIG. 22B. Thus, when the loading particles possess small sizes, the congestion effect and trapping effect in SBA-15 framework can be overcome.

The nanoparticle trapping effect is also reflected by the results in FIG. 22 that a higher loading leads to a lower $D_{CH_4}$ in both mesoporous networks. In short, the DMC results demonstrate the necessity of considering the trapping effect and congestion effect of nanoparticles and mesoporous structures on diffusivity.

G. BET Surface Area for SBA-15 and SBA-16

$N_2$ physisorption was used to analyze solid surface and pore size distribution by a NOVA 4200 surface area analyzer. The surface areas were calculated adopting the Brunauer-Emmett-Teller (BET) method. Pore size distributions were calculated by Brunauer-Joyner-Halenda (BJH) method based on the adsorption of $N_2$ isotherm curve.

Figure 23:
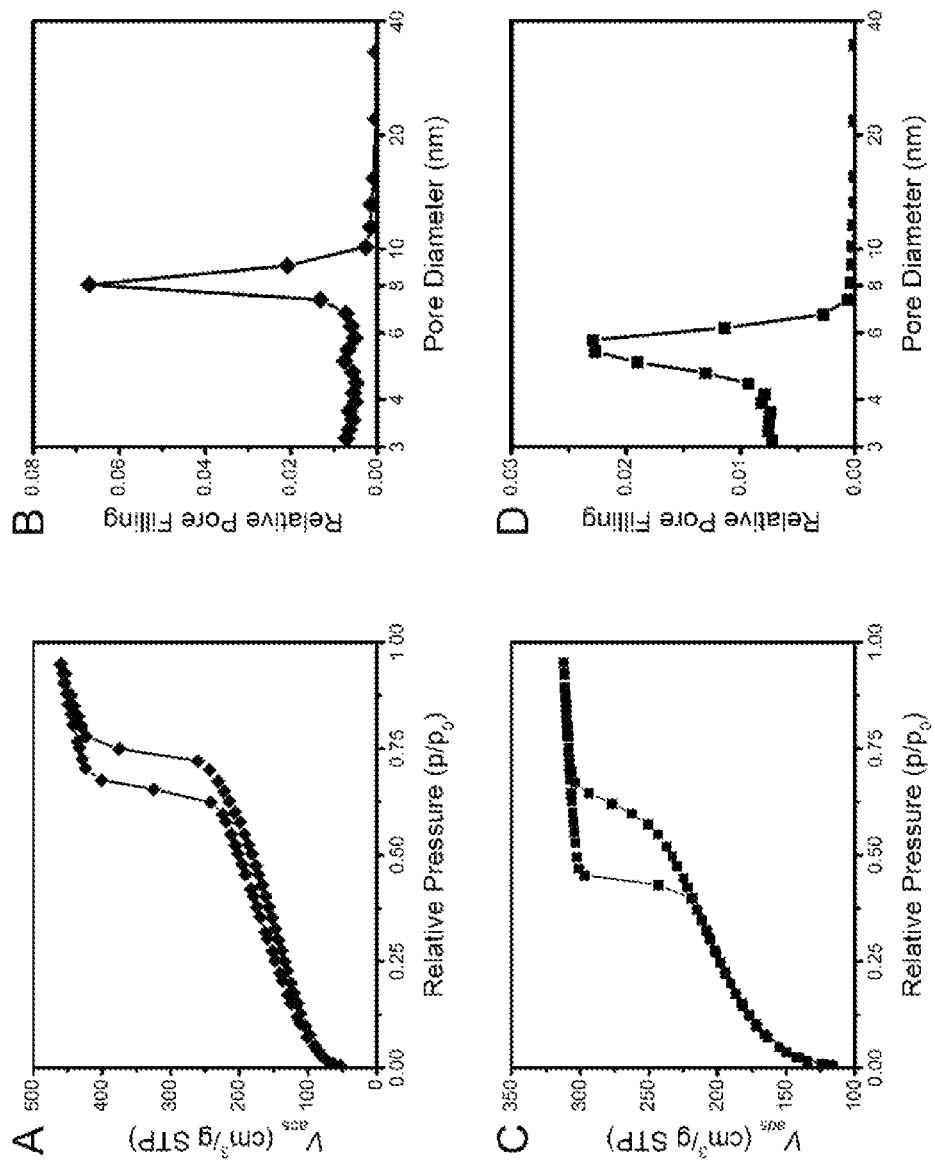
FIG. 23 shows surface analysis results of SBA-15 and SBA-16, where isothermal curves for SBA-15 and SBA-16 are shown in A and C, respectively, and pore size distributions for SBA-15 and SBA-16 are shown in B and D, respectively.

FIG. 23 shows surface analysis results of SBA-15 and SBA-16, where (A) and (C) are isothermal curves of (A) SBA-15 and (C) SBA-16; Pore size distribution of (B) SBA-15 and (D) SBA-16. The mesoporous silica SBA-15 exhibited a uniform pore size of 8 nm, while SBA-16 had a wider pore size distribution with a peak at 6 nm. The comparable surface areas of for SBA-15 and SBA-16 were 550 $m^2$/g and 643 $m^2$/g, respectively. The pore volume was 0.66 $cm^3$/g for SBA-15 and 0.48 $cm^3$/g for SBA-16.

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

We claim:

1. An oxygen carrier, comprising:
   a mesoporous silica support; and
   a plurality of iron oxide-based nanoparticles immobilized on the mesoporous silica support,
   wherein the plurality of iron oxide-based nanoparticles comprise 20 volume percent to 70 volume percent of mesopores in the mesoporous silica support;
   wherein the plurality of iron oxide-based nanoparticles further comprise a dopant selected from: cobalt (Co), nickel (Ni), and copper (Cu).

2. The oxygen carrier according to claim 1, wherein the plurality of iron oxide-based nanoparticles include $Fe_2O_3$.

3. The oxygen carrier according to claim 2, wherein each of the plurality of iron oxide-based nanoparticles comprise 22 weight percent to 86 weight percent of the mesoporous silica support.

4. The oxygen carrier according to claim 1, wherein the mesoporous silica support is Santa Barbara Amorphous-15 silica (SBA-15), Santa Barbara Amorphous-16 silica (SBA-16), mesoporous silica MCM-41, or mesoporous silica MCM-48.

5. The oxygen carrier according to claim 1, wherein a portion of the plurality of iron oxide-based nanoparticles is immobilized on a first type of mesoporous silica support;
wherein a remainder portion of the plurality of iron oxide-based nanoparticles is immobilized on a second type of mesoporous silica support, the second type of mesoporous silica support being different from the first type of mesoporous silica support.

6. The oxygen carrier according to claim 1, wherein the iron oxide-based nanoparticles have an average diameter of 2 nm to 50 nm;
wherein the mesoporous silica support has an average diameter of about 1 μm to about 4 μm; and
wherein the mesoporous silica support has an average pore diameter of about 2 nm to about 50 nm.

7. The oxygen carrier according to claim 1, wherein a dopant concentration is 0.5 atomic percent (at %) to 15 at %.

8. The oxygen carrier according to claim 7, wherein the dopant is copper.

9. A method of operating a reactor, the method comprising:
providing a carbonaceous feedstock to an inlet of the reactor;
providing oxygen carrier particles within the reactor, wherein each of the oxygen carrier particles comprises the oxygen carrier of claim 1; and
collecting a product stream from an outlet of the reactor, the product stream including at least one of: $H_2$, carbon monoxide (CO), and $C_{2+}$ hydrocarbon.

10. The method according to claim 9, further comprising arranging the reactor as a fixed bed, a moving bed, or a fluidized bed, wherein the carbonaceous feedstock includes at least one of methane ($CH_4$), coal, carbon monoxide (CO), and carbon dioxide ($CO_2$).

11. The method according to claim 9, further comprising:
after collecting the product stream, providing an oxidizing agent to the inlet of the reactor; and
collecting a second product stream from the outlet of the reactor, the second product stream including carbon monoxide (CO).

12. The method according to claim 9, wherein the plurality of iron oxide-based nanoparticles include $Fe_2O_3$, ferrite, or combinations thereof; and
wherein the mesoporous silica support is mesoporous silica SBA-15, mesoporous silica SBA-16, or mesoporous silica MCM-41.

13. The method according to claim 9, wherein the iron oxide-based nanoparticles further comprise a dopant selected from: Co, Ni, and Cu.

14. The method according to claim 9, wherein a carbonaceous feedstock conversion rate is greater than 95%.

15. A reactor, comprising:
a feedstock inlet in fluid communication with a carbonaceous feedstock source;
a product stream outlet; and
oxygen carrier particles, wherein each of the oxygen carrier particles comprises the oxygen carrier of claim 1.

16. The reactor according to claim 15, wherein the plurality of iron oxide-based nanoparticles include $Fe_2O_3$, ferrite, or combinations thereof;
wherein the iron oxide-based nanoparticles have an average diameter of 2 nm to 10 nm;
wherein the mesoporous silica support has an average diameter of about 1 μm to about 4 μm; and
wherein the mesoporous silica support has an average pore diameter of about 6 nm to about 11 nm.

* * * * *